US010739934B2

(12) United States Patent
Vaskevitch et al.

(10) Patent No.: US 10,739,934 B2
(45) Date of Patent: Aug. 11, 2020

(54) SYSTEMS AND METHODS TO GENERATE OVERLAYS ON A MEDIA LIBRARY CALENDAR

(71) Applicant: Mylio, LLC, Bellevue, WA (US)

(72) Inventors: David Vaskevitch, Medina, WA (US); Jean-Pierre Duplessis, Kirkland, WA (US); Marcus Rein Donner, Seattle, WA (US); James Love, Maple Valley, WA (US)

(73) Assignee: MYLIO, LLC, Bellevue, WA (US)

( * ) Notice: Subject to any disclaimer, the term of this patent is extended or adjusted under 35 U.S.C. 154(b) by 575 days.

(21) Appl. No.: 15/599,885

(22) Filed: May 19, 2017

(65) Prior Publication Data
US 2017/0336922 A1 Nov. 23, 2017

Related U.S. Application Data

(60) Provisional application No. 62/339,621, filed on May 20, 2016.

(51) Int. Cl.
G06F 3/0481 (2013.01)
G06F 3/0482 (2013.01)
(Continued)

(52) U.S. Cl.
CPC .......... G06F 3/0481 (2013.01); G06F 3/0482 (2013.01); G06Q 10/06311 (2013.01); G06Q 10/109 (2013.01); G06F 40/103 (2020.01); G06Q 10/10 (2013.01); G06Q 10/1095 (2013.01)

(58) Field of Classification Search
CPC ....... G06F 3/0482; G06F 17/21; G06F 3/0481
See application file for complete search history.

(56) References Cited

U.S. PATENT DOCUMENTS

2005/0105374 A1  5/2005  Finke-Anlauff et al.
2010/0070894 A1  3/2010  Krishnamurthy et al.
(Continued)

OTHER PUBLICATIONS

6 Powerful Reasons to Use a Gantt Chart for Scheduling—Visual Planning—2016.*
(Continued)

Primary Examiner — David E Choi
(74) Attorney, Agent, or Firm — Seed IP Law Group LLP

(57) ABSTRACT

Systems and methods to generate visual overlays on a graphical user interface (GUI) based calendar which is viewable according to numerous views, such as a month view, year view, decade view, etc. The calendar may be associated with a library ("media library") of various objects (e.g., images, videos, music, documents) stored across one or more storage devices. The system may generate a date-range overlay in which the user creates a query, or may generate an autonomously extracted overlay from a container of media objects. The system autonomously extracts date(s) from media files in the container or query result and generates an overlay on the calendar which corresponds to the autonomously extracted date(s) of the files in the container or query. The generated overlay may be displayed on the calendar as a single date-range overlay or as individual overlays associated with each media object in the container or query.

35 Claims, 15 Drawing Sheets

(51) Int. Cl.
*G06Q 10/06* (2012.01)
*G06Q 10/10* (2012.01)
*G06F 40/103* (2020.01)

(56) References Cited

U.S. PATENT DOCUMENTS

2010/0088617 A1  4/2010  Watanabe
2011/0283210 A1  11/2011  Berger et al.
2012/0102431 A1  4/2012  Krolczyk et al.

OTHER PUBLICATIONS

International Search Report and Written Opinion of the International Searching Authority, dated Jul. 24, 2017, for International Application No. PCT/US2017/033572, 18 pages.

* cited by examiner

*1200*

| 1980s |
| 1980 |
| 1981 |
| 1982 |
| 1983 |
| 1984 |
| 1985 |
| 1986 |
| 1987 |
| 1988 |
| 1989 |

✕　　　　　　NEW EVENT

TITLE

COLLEGE YEARS

CATEGORY　　　　　　　　　　　　EDUCATION

FROM ( 1985 )  ( MONTH? )　　　　　　📅

TO ( 1989 )  ( MONTH? )　　　　　　📅

( 4 YEARS, 11 MONTHS )

DESCRIPTION

SAVE

FIG. 12

SYSTEMS AND METHODS TO GENERATE OVERLAYS ON A MEDIA LIBRARY CALENDAR

BACKGROUND

Technical Field

The present disclosure generally relates to replication, synchronization, grouping and/or presentation of data objects across multiple processor-based devices.

Description of the Related Art

End users often have data collections (e.g., photos, videos, music, documents) that are spread across multiple processor-based devices (e.g., phones, personal computers, laptops, gaming consoles, tablet devices, digital cameras, cloud storage, etc.) spanning multiple networks. As computing devices become more prevalent and widely used among the general population, the amount of data generated and utilized by such devices has rapidly increased.

Modern devices, while more powerful than ever, continue to be challenged in terms of their ability to store all of the information that users want on all of their various devices. For instance, digital photography has recently become extremely popular, and as a result, digital pictures may cause many devices to run into storage limits. Further, this storage problem is only getting worse because most portable devices are using more expensive and smaller storage solid-state memory devices, as opposed to magnetic storage devices.

Further, recent advancements in communication technology can enable computing devices to communicate data at a high rate of speed. These advancements have led to, among other technologies, the implementation of distributed computing services that can, for example, be conducted using computing devices at multiple locations on a network. In addition, such advancements have enabled the implementation of services such as network-based backup, which allow a user of a computing device to maintain one or more backup copies of data associated with the computing device at a remote location on a network.

Existing systems and/or data backup solutions enable a user to store backup information in a location and/or media separate from its original source. Thus, for example, data from a computing device can be backed up from a hard drive to external media such as a tape drive, an external hard drive, or the like. However, in an implementation of network-based backup and/or other solutions that can be utilized to provide physically remote locations for storing backup data, costs and complexity associated with transmission and restoration of user data between a user machine and a remote storage location can substantially limit the usefulness of a backup system. For example, in the case where backup data is stored at a remote network location, data associated with respective versions of an original copy of a file and/or system image can be transmitted to remote storage (e.g., cloud), where the respective versions can later be retrieved for restoration. However, storing all of a user's content in a remote storage can be prohibitively expensive (and bandwidth consuming) for content such as digital photos and videos.

Data replication is used to protect data from loss, to ensure continuity and to provide access to content on other devices (e.g., access to pictures taken on a mobile phone on a desktop computer) while keeping the total cost of ownership relatively low. Generally, data replication requires making copies of data from a source device to one or more target devices. Target devices can reside on the same network as the host device or can be remotely located on other networks or remote locations. Data replication may be performed for several reasons including device synchronization, disaster recovery planning, content distribution, backup consolidation, etc.

Safeguarding user data is of primary importance. Loss of data can result from electrical outages, device damage or theft, natural or human caused disasters such as floods, tornadoes, fires, and other such events that can cause physical loss of processor-based devices and/or loss of the data stored thereon.

Thus, users often want to have content (e.g., photos) on some or all of their multiple devices. Users also want their content to be backed up and protected, often to a remotely located device. In some instances, users may want only a portion of their content on some devices. Further, in some instances users may want alternative forms of content (e.g., lower resolution photos) on some of their devices. Current systems either require the user to perform a great deal of manual work or require all of the content to be stored in the cloud, which is very expensive and impractical for many users.

With the advancement in digital technology and storage capabilities, often users may have numerous (e.g., tens of thousands or more) of objects (e.g., photos, documents) stored across multiple devices (e.g., laptop, tablet, smartphone, digital camera, cloud). Organizing, viewing or otherwise consuming or manipulating such objects can quickly become time consuming and overwhelming tasks.

In view of the foregoing, it is desirable to implement automated organization and presentation techniques with improved efficiency, convenience and ease of use.

BRIEF SUMMARY

A method of operation for a data storage system to present a plurality of objects across a plurality of processor-based devices may be summarized as including storing, in at least one nontransitory processor-readable storage medium of the data storage system, a media library which includes a plurality of media objects; extracting, by at least one processor communicatively coupled to the at least one nontransitory processor-readable storage medium, respective creation date data from each of the plurality of objects in the media library; receiving, by the at least one processor via a user interface of at least one of the plurality of processor-based devices, a request to generate an event associated with the media library; responsive to receiving the request to generate an event, causing, by the at least one processor, an event generation interface to be presented to a user via the user interface of the at least one of the plurality of processor-based devices, the event generation interface provides a request for a date range of the event; receiving, by the at least one processor via the user interface of the at least one of the plurality of processor-based devices, an indication of the date range for the event; for each of the plurality of media objects in the media library, evaluating, by the at least one processor, the extracted creation date data to determine whether the media object was created within the specified date range of the event; logically associating, by the at least one processor, media objects determined to have been created within the specified date range of the event with the event in the at least one nontransitory processor-readable storage medium; causing, by the at least one processor, a calendar to be graphically presented via the user interface of the at least one of the plurality of processor-based devices;

and causing, by the at least one processor, a selectable event indicator associated with the generated event to be graphically presented on the calendar, the selectable event indicator sized and positioned on the calendar to be associated with at least one of a date or a date range displayed by the calendar. Receiving an indication of the date range for the event may include receiving, by the at least one processor via the user interface of the at least one of the plurality of processor-based devices, a start day and an end day for the event. Receiving an indication of the date range for the event may include receiving, by the at least one processor via the user interface of the at least one of the plurality of processor-based devices, an imprecise date range. Receiving an indication of the date range for the event may include receiving, by the at least one processor via the user interface of the at least one of the plurality of processor-based devices, a start day and an end day for the event, at least one of the start day and the end day specified by the user by decade, year or month. Causing a selectable event indicator associated with the generated event to be graphically presented on the calendar may include causing the selectable event indicator to be displayed on the calendar associated with at least one of a: day, month, year or decade.

The method may further include receiving, by the at least one processor via the user interface of the at least one of the plurality of processor-based devices, an indication of a selection of the selectable event indicator; and responsive to receiving the indication of a selection of the selectable event indicator, causing, by the at least one processor, a presentation of the media objects associated with the generated event on the user interface of the at least one of the plurality of processor-based devices. Causing, by the at least one processor, a calendar to be graphically presented by the user interface of the at least one of the plurality of processor-based devices may include causing a number of years to be presented on the calendar, and causing the selectable event indicator to be graphically presented on the calendar may include causing the selectable event indicator to be associated with each of the number of years presented on the calendar which overlap with the date range of the event. Causing, by the at least one processor, a calendar to be graphically presented by the user interface of the at least one of the plurality of processor-based devices may include causing a number of months to be presented on the calendar, and causing the selectable event indicator to be graphically presented on the calendar may include causing the selectable event indicator to be associated with each of the number of months presented on the calendar which overlap with the date range of the event. Causing, by the at least one processor, a calendar to be graphically presented by the user interface of the at least one of the plurality of processor-based devices may include causing a number of days to be presented on the calendar, and causing the selectable event indicator to be graphically presented on the calendar may include causing the selectable event indicator to be associated with each of the number of days presented on the calendar which overlap with the date range of the event.

The method may further include causing, by the at least one processor, a plurality of selectable event indicators each associated with respective ones of a plurality of events to be graphically presented on the calendar. Each of the plurality of events may be associated with at least one category, and causing a plurality of selectable event indicators to be graphically presented on the calendar may include causing a plurality of selectable event indicators to be graphically presented on the calendar in an order determined at least in part on the respective categories of each of the plurality of events.

The method may further include causing, by the at least one processor, a graphical representation of at least one media object associated with the event to be displayed on the calendar, the graphical representation of the at least one media object located on a particular day, month, year or decade displayed on the calendar which overlaps with the date range of the event.

The method may further include determining, by the at least one processor, which of the at least one media object associated with the event to display on the calendar based at least in part on one or more criteria. Determining which of the at least one media object to display on the calendar may include determining which of the at least one media object to display on the calendar based at least in part on user ratings of the media objects associated with the event. Determining which of the at least one media object to display on the calendar may include determining which of the at least one media object to display on the calendar based at least in part on at least one of: a user rating, a tag, text associated with the media object, viewing information for the media object, editing information for the media object, sharing information the media object, or a creation date for the media object.

The method may further include generating, by the at least one processor, an event smart album associated with the event, the event smart album including each of the media objects associated with the generated event.

The method may further include causing, by the at least one processor, the generated event smart album to be graphically presented by the user interface of the at least one of the plurality of processor-based devices in a timeline including a plurality of event smart albums sorted based at least in part on the respective date ranges of the plurality of event smart albums. Causing the generated event smart album to be graphically presented may include causing at least one media object associated with the event smart album to be graphically presented by the user interface of the at least one of the plurality of processor-based devices.

The method may further include determining, by the at least one processor, which of the at least one media object associated with the event smart album to display based at least in part on one or more criteria. Determining which of the at least one media object to display may include determining which of the at least one media object to display based at least in part on user ratings of the media objects associated with the event smart album. Determining which of the at least one media object to display may include determining which of the at least one media object to display based at least in part on at least one of: a user rating, a tag, text associated with the media object, viewing information for the media object, editing information for the media object, sharing information the media object, or a creation date for the media object. Storing a media library which may include a plurality of media objects includes storing a media library which may include a plurality of media objects on at least two nontransitory processor-readable storage media associated with a respective at least two computing devices. Storing a media library which may include a plurality of media objects may include storing a media library which includes a plurality of media objects includes at least two or more media object types selected from the group of media object types consisting of: image media objects, video media objects, and document media objects.

The method may further include receiving, by the at least one processor, an indication of a category for the event; and logically associating, by the at least one processor, the indicated category with the event in the at least one nontransitory processor-readable storage medium.

The method may further include determining, by the at least one processor, whether the indicated event has a sub-event associated with the event; and responsive to determining the indicated event has a sub-event associated with the event, restricting, by the at least one processor, a permitted date range for the event to be not less than a specified date range of the sub-event.

The method may further include causing, by the at least one processor, a plurality of selectable event indicators associated with a respective plurality of events to be dynamically graphically presented on the calendar, the number and order of the plurality of selectable event indicators graphically presented on the calendar based at least in part on a priority of the event, a date range of the event, a duration of the event, or an amount of space available on the user interface of the at least one of the plurality of processor-based devices.

The method may further include receiving, by the at least one processor via the user interface of at least one of the plurality of processor-based devices, one or more filtering criteria; and modifying which of the plurality of media objects are associated with the generated event based at least in part on the received one or more filtering criteria. Receiving one or more filtering criteria may include receiving at least one of: textual filtering criteria, media type filtering criteria, media content filtering criteria, or user rating filtering criteria.

A data storage system to present a plurality of objects stored across a plurality of processor-based devices may be summarized as including at least one nontransitory processor-readable medium that stores processor-executable instructions; and at least one processor communicably coupled to the at least one nontransitory processor-readable medium, the at least one processor: stores a media library which may include a plurality of media objects in the at least one nontransitory processor-readable storage medium; extracts respective creation date data from each of the plurality of objects in the media library; receives a request to generate an event associated with the media library via a user interface of at least one of the plurality of processor-based devices; responsive to receipt of the request to generate an event, causes an event generation interface to be presented to a user via the user interface of the at least one of the plurality of processor-based devices, the event generation interface provides a request for a date range of the event; receives, via the user interface of the at least one of the plurality of processor-based devices, an indication of the date range for the event; for each of the plurality of media objects in the media library, evaluates the extracted creation date data to determine whether the media object was created within the specified date range of the event; logically associates media objects determined to have been created within the specified date range of the event with the event in the at least one nontransitory processor-readable storage medium; causes a calendar to be graphically presented via the user interface of the at least one of the plurality of processor-based devices; and causes a selectable event indicator associated with the generated event to be graphically presented on the calendar, the selectable event indicator sized and positioned on the calendar to be associated with at least one of a date or a date range displayed by the calendar. The at least one processor may receive, via the user interface of the at least one of the plurality of processor-based devices, a start day and an end day for the event. The at least one processor may receive, via the user interface of the at least one of the plurality of processor-based devices, an imprecise date range. The at least one processor may receive, via the user interface of the at least one of the plurality of processor-based devices, a start day and an end day for the event, at least one of the start day and the end day specified by the user by decade, year or month. The at least one processor may cause the selectable event indicator to be displayed on the calendar associated with at least one of a: day, month, year or decade. The at least one processor may receive, via the user interface of the at least one of the plurality of processor-based devices, an indication of a selection of the selectable event indicator; and responsive to receipt of the indication of a selection of the selectable event indicator, cause a presentation of the media objects associated with the generated event on the user interface of the at least one of the plurality of processor-based devices. The at least one processor may cause a number of years to be presented on the calendar; and cause the selectable event indicator to be associated with each of the number of years presented on the calendar which overlap with the date range of the event. The at least one processor may cause a number of months to be presented on the calendar; and cause the selectable event indicator to be associated with each of the number of months presented on the calendar which overlap with the date range of the event. The at least one processor may cause a number of days to be presented on the calendar; and cause the selectable event indicator to be associated with each of the number of days presented on the calendar which overlap with the date range of the event. The at least one processor may cause a plurality of selectable event indicators each associated with respective ones of a plurality of events to be graphically presented on the calendar. Each of the plurality of events may be associated with at least one category, and the at least one processor may cause a plurality of selectable event indicators to be graphically presented on the calendar in an order determined at least in part on the respective categories of each of the plurality of events. The at least one processor may cause a graphical representation of at least one media object associated with the event to be displayed on the calendar, the graphical representation of the at least one media object located on a particular day, month, year or decade displayed on the calendar which overlaps with the date range of the event. The at least one processor may determine which of the at least one media object associated with the event to display on the calendar based at least in part on one or more criteria. The at least one processor may determine which of the at least one media object to display on the calendar based at least in part on user ratings of the media objects associated with the event. The at least one processor may determine which of the at least one media object to display on the calendar based at least in part on at least one of: a user rating, a tag, text associated with the media object, viewing information for the media object, editing information for the media object, sharing information the media object, or a creation date for the media object. The at least one processor may generate an event smart album associated with the event, the event smart album including each of the media objects associated with the generated event. The at least one processor may cause the generated event smart album to be graphically presented by the user interface of the at least one of the plurality of processor-based devices in a timeline including a plurality of event smart albums sorted based at least in part on the respective date ranges of the plurality of event smart albums.

The at least one processor may cause at least one media object associated with the event smart album to be graphically presented by the user interface of the at least one of the plurality of processor-based devices. The at least one processor may determine which of the at least one media object associated with the event smart album to display based at least in part on one or more criteria. The at least one processor may determine which of the at least one media object to display based at least in part on user ratings of the media objects associated with the event smart album. The at least one processor may determine which of the at least one media object to display based at least in part on at least one of: a user rating, a tag, text associated with the media object, viewing information for the media object, editing information for the media object, sharing information the media object, or a creation date for the media object. The at least one processor may store a media library which may include a plurality of media objects on at least two nontransitory processor-readable storage media associated with a respective at least two computing devices. The at least one processor may store a media library which may include a plurality of media objects including at least two or more media object types selected from the group of media object types consisting of: image media objects, video media objects, and document media objects. The at least one processor may receive an indication of a category for the event; and logically associate the indicated category with the event in the at least one nontransitory processor-readable storage medium. The at least one processor may determine whether the indicated event has a sub-event associated with the event; and responsive to a determination that the indicated event has a sub-event associated with the event, restrict a permitted date range for the event to be not less than a specified date range of the sub-event. The at least one processor may cause a plurality of selectable event indicators associated with a respective plurality of events to be dynamically graphically presented on the calendar, the number and order of the plurality of selectable event indicators graphically presented on the calendar based at least in part on a priority of the event, a date range of the event, a duration of the event, or an amount of space available on the user interface of the at least one of the plurality of processor-based devices. The at least one processor may receive, via the user interface of at least one of the plurality of processor-based devices, one or more filtering criteria; and modify which of the plurality of media objects are associated with the generated event based at least in part on the received one or more filtering criteria. The one or more filtering criteria may include at least one of: textual filtering criteria, media type filtering criteria, media content filtering criteria, or user rating filtering criteria.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 12 is a screenshot of a graphical user interface of the object management and presentation system showing an event generation interface, according to one illustrated implementation.

DETAILED DESCRIPTION

Figure 1:
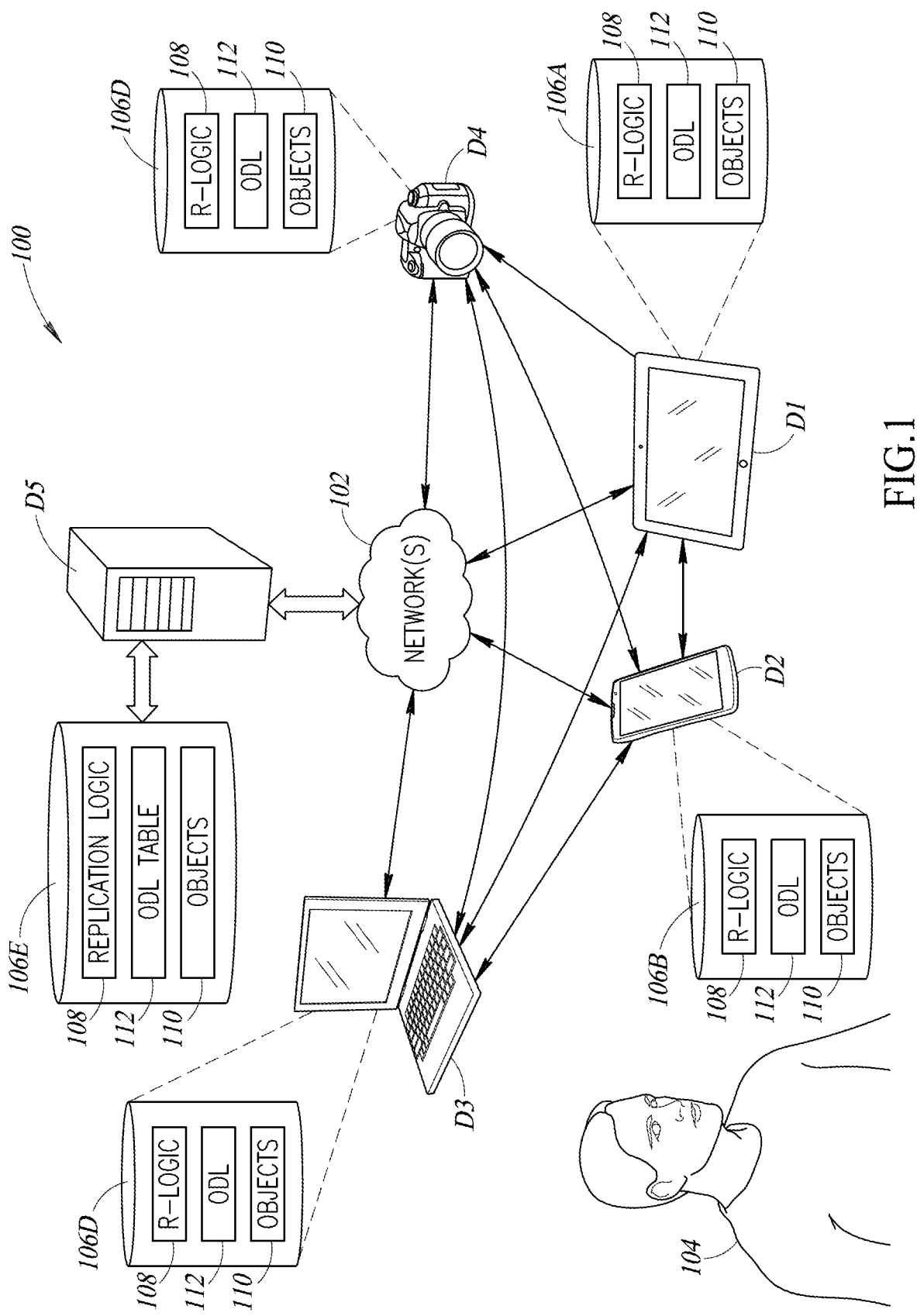
FIG. 1 is a networked environment in which an object management and presentation system may be implemented, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Implementations of the present disclosure address some or all of the aforementioned issues by providing systems and methods to generate visual overlays on a graphical user interface (GUI) based calendar which is viewable according to numerous views, such as a month view, year view, decade view, etc. The calendar may be associated with a library ("media library") of various objects (e.g., images, videos, music, documents) stored across one or more storage devices. The visual overlays may be indicative of an "event" (e.g., media files in a query result, media files in a container).

Generally, as discussed further below, there are at least two ways to generate an overlay on the calendar. First, the system may generate a date-range overlay. In this situation, the user creates a query with a manually specified date-range or an autonomously determined date range. The user may manually specify a date range using a start date and an end date. The date-range, start date, and/or the end date for the query may be specified using precise dates or imprecise dates, as discussed further below. Responsive to receiving an indication of a date-range from the user, the system may analyze the media library for any media objects which have a creation date in the specified date range and associate such media objects with a date-range overlay on the calendar of the system. For queries in which a date range is not specified, the system may autonomously determine the date range for the query by analyzing the creation date(s) of the media file(s) in the query result. Additionally, a smart album may be autonomously generated which covers the specified date range with the query results displayed in the smart album. The query may be referred to herein as an "event."

Second, the system may generate an autonomously extracted overlay. In this situation, the user has a container of media objects. The container may be folder, album, storage device, query or query based smart album (existing or created). The system autonomously extracts date(s) from media files in the container and generates an overlay on the calendar which corresponds to the autonomously extracted date(s) of the files in the container. In this case, the date or dates for the overlay are determined by the creation date of the media files in the container. As an example of generating a date-range overlay, a user may input a query into the system for any "Panoramic" photo in the user's media library. The query may find two media files that match the query: Panoramic) created on Mar. 1, 1990; and Panoramic2 created on Mar. 1, 2016. The system autonomously extracts the creation dates from the media files in the query result. Using the results of the query and the extracted creation dates, the system creates a smart album named "Panoramic," for example, which includes the results to be overlaid on the calendar.

The generated date-range overlay or autonomously extracted results overlay may be displayed in at least two ways. For example, the overlay may be displayed as a single overlay which covers the date range between the start date and the end date of the media files in the query result or container. In the example above, a single overlay may be provided which spans from Mar. 1, 1990, the creation date of Panoramicl, to Mar. 1, 2016, the creation date of Panoramic2. Thus, a single overlay is provided which covers every day of the 16 years between Mar. 1, 1990 and Mar. 1, 2016.

As another example, the generated date-range overlay or autonomously extracted results overlay may be displayed as individual overlays for each media file in the query result or container. In the example above, a first individual overlay may be overlaid on Mar. 1, 1990, the creation date of Panoramic1, and a separate second individual overlay may be overlaid on Mar. 1, 2016, the creation date of Panoramic2. In this second example, the overlay for the query (or container) is shown on only two days of the calendar (i.e., Mar. 1, 1990 and Mar. 1, 2016).

The manner in which the extracted dates from a container or query are overlaid on the calendar is separate from the autonomous process of extracting the dates, and can be determined by the user or can be determined autonomously by the system. That is, the overlay could be displayed as a single date-range overlay or as individual overlays associated with each media object in the container or query.

The implementations of the present disclosure may be provided in an environment which automatically replicates content across a user's devices in a way that allows for full or partial replication, alternate forms, local network and remote location protection, with users being able to use their own storage and/or provided storage in the cloud. To provide context, such an environment is discussed below with reference to FIGS. 1 and 2. In some implementations, instances or copies of data objects (e.g., image files, video files, audio files, documents) may exist in a plurality of forms or representations. For example, in the case of image files, the image data object may exist in multiple forms wherein each form is an image file having a different resolution from the other forms of the data object. In some of the examples discussed below, image data objects may be in the form of original image files, lower resolution preview image files, and even lower resolution thumbnail image files.

In some implementations, the systems and methods provide partial or full object replication between multiple processor-based devices utilizes a form of a multi-master architecture in which any device can provide content to any other device to which the device is connected. No device is designated as a special master device/server from which all other devices must fetch content. Some implementations provide temporary protection of instances of original forms of objects, for example, when a user is traveling. Some implementations provide for relaying and shuttling of instances of objects across multiple devices via one or more networks and/or via peer-to-peer wired or wireless communications. Additionally, in some implementations discussed below, support for container and individual object replication policies with inheritance is provided. It should be appreciated that, as used herein, sending or receiving objects, or one or more forms of objects, may be equivalent to sending or receiving instances or copies of objects, or instances or copies of one or more forms of the objects. Such functionality is discussed in further detail below with reference to the figures.

FIG. 1 shows an example networked environment in which implementations of an object management system 100 of the present disclosure may be practiced. The networked environment includes a plurality of user processor-based devices D1-D4 and one or more service provider processor-based devices D5 (only one shown for clarity). The processor-based devices D1-D5 may be communicatively coupled with each other via one or more wired and/or wireless networks 102 (e.g., Wi-Fi, cellular, Internet). The service provider processor-based device D5 may include two or more devices (e.g., servers) interconnected via one or more networks which share resources, software, and/or data to any or all of the plurality of user processor-based devices and/or other devices. For example, the service provider processor-based device D5 may be one or more devices implemented utilizing a cloud-based architecture.

The user processor-based devices D1-D4 may represent various devices in the domain of a user 104. That is, the plurality of user processor-based devices D1-D4 may be accessed, used, controlled and/or owned by the user 104. Such user processor-based devices D1-D4 may be located in different locations, such as the user's home, school, office, vehicle, person, etc. Moreover, such user processor-based devices D1-D4 may be used for different applications, such as entertainment, education, occupation, communication, travel, etc. Similarly, the service provider processor-based device D5 may also have a portion of its storage and/or processing capacity allocated to the user 104.

In the illustrated implementation, the user processor-based devices D1-D4 are depicted as a tablet computer D1, a smartphone D2, a laptop computer D3, and a digital camera D4. The user processor-based devices D1-D4 may include other types of devices, such as a desktop computer, gaming console, set-top box, video camera, audio recorder, media player, smart watch, smart TV, remote storage device accessible via a network (e.g., using a web client or application), etc.

In addition to being communicatively coupled through the one or more networks 102, some or all of the user processor-based devices D1-D4 may communicate directly with each other without communicating through the network 102 and/or without communicating through an intermediate access point. For example, the user processor-based devices D1-D4 may communicate with each other through a local area network, wireless ad hoc network, Wi-Fi Direct®, USB, Bluetooth®, NFC, 802.15 (ZigBee®), etc. As discussed further below, such communications may enable various "offline" replication, synchronization, relay, shuttle, or other operations to be carried out without communicating through the one or more networks 102, which may advantageously provide communications when one or more user processor-based devices D1-D4 is not able to connect to the one or more networks or to another one of the devices. In particular, in some implementations changes can occur to objects and policies which are replicated without the devices being connected. Once the devices are connected, the policies are enforced and the content is synchronized.

The processor-based devices D1-D5 each include a respective nontransitory processor-readable medium 106A-106E. Some or all of the processor-based devices D1-D5 may include a replication application or logic 108 which utilizes the resources of the respective processor-based device to perform various replication, synchronization, relay, shuttle, or other operations. It is noted that in some implementations, the digital camera D4 may not include the replication logic 108. In these instances, the digital camera D4 may be used as an ingestion device which provides content to one or more computing devices, such as the devices D1, D2, D3 or D5, which in turn replicate the content to other devices.

The processor-based devices D1-D5 collectively store the user's collection of objects 110, which may include various types of data objects such as image files, audio files, video files, documents, etc. As discussed further below, each of the objects may be represented in multiple forms, and one or more forms of each object may be simultaneously stored on one or more processor-based devices D1-D5. For example, an instance of an original form of an image may be stored on the nontransitory processor-readable medium 106D of the digital camera D4 and the nontransitory processor-readable medium 106C of laptop computer D3 of the user 104. As another example, an instance of an original form of an image may be stored on the nontransitory processor-readable medium 106C of the laptop computer D3, while an instance of a preview form of the image may be stored on the nontransitory processor-readable medium 106B of the smartphone D2 of the user 104, and an instance of a thumbnail form of the image may be stored on the nontransitory processor-readable medium 106A of the tablet computer D1 of the user.

As discussed in further detail below, each of the processor-based devices D1-D5 may store an object device link (ODL) table 112 which is replicated on a respective nontransitory processor-readable medium thereof which is used to perform object replication, synchronization, relay, shuttle, or other operations between the processor-based devices. The ODL table 112 stored on each of the processor-based devices D1-D5 allows each of the processor-based devices to be aware of whether each other processor-based device currently has a form of an object or needs a form of an object. The ODL table may be replicated to each of the devices using any suitable replication technology.

Figure 2:
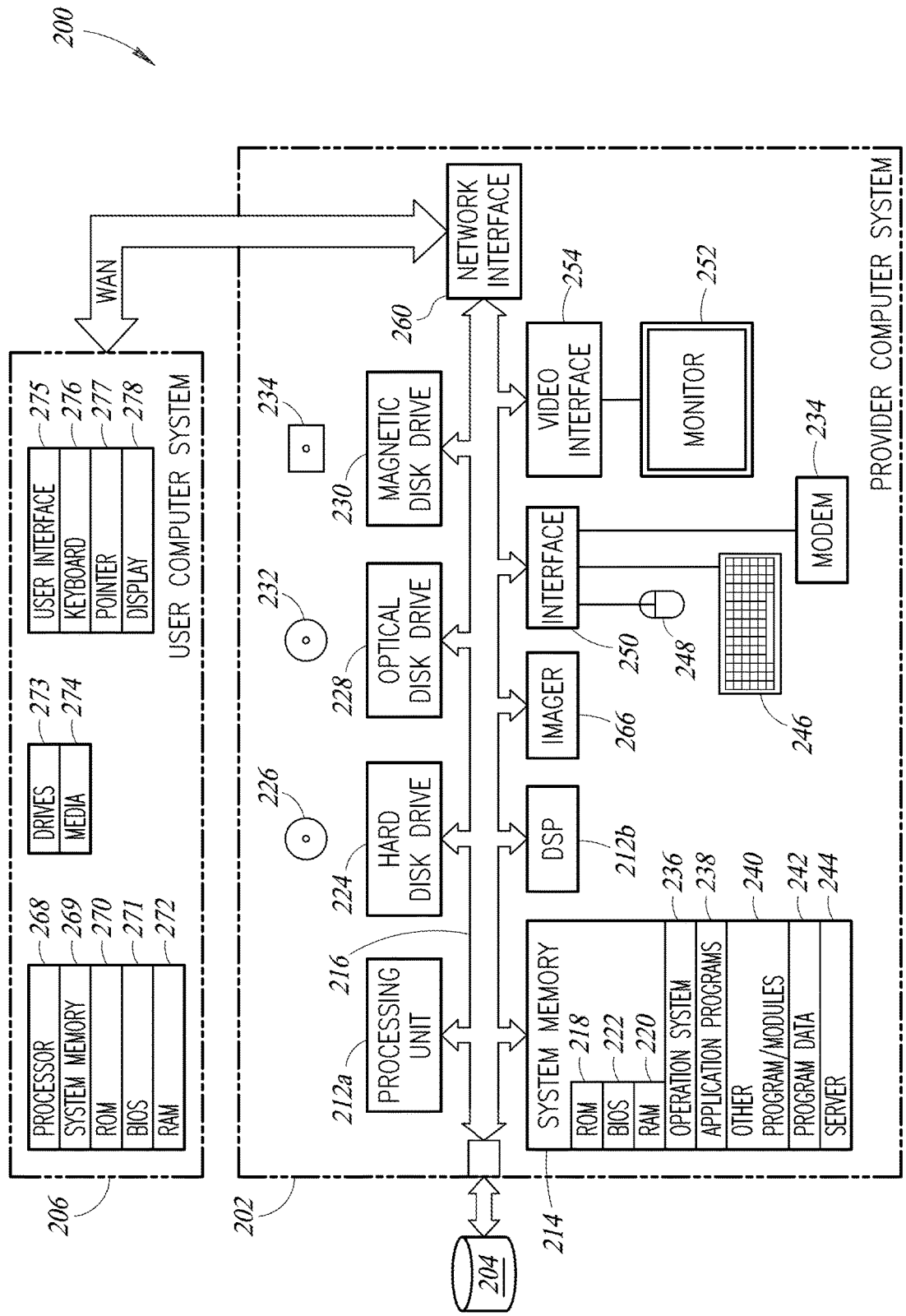
FIG. 2 is a functional block diagram of an object management and presentation system and user processor-based device, according to one illustrated implementation.

FIG. 2 shows a networked environment 200 comprising one or more service provider server computer systems or devices 202 (only one illustrated) and one or more associated nontransitory computer- or processor-readable storage medium 204 (only one illustrated). The associated nontransitory computer- or processor-readable storage medium 204 is communicatively coupled to the service provider server computer system(s) 202 via one or more communications channels, for example, one or more parallel cables, serial cables, or wireless channels capable of high speed communications, for instance, via FireWire®, Universal Serial Bus® (USB) 2 or 3, and/or Thunderbolt®, Gigabyte Ethernet®.

The networked environment 200 also includes one or more user processor-based systems or devices 206 (only one illustrated). For example, the user processor-based systems 206 may be representative of any one of the user processor-based devices of FIG. 1. The user processor-based systems 206 are communicatively coupled to the service provider server computer system(s) 202 by one or more communications channels, for example, one or more wide area networks (WANs) 210, for instance the Internet or Worldwide Web portion thereof.

In some implementations, the processor-based systems 206 may function as a client to the service provider server computing system 202. In some implementations, the service provider server computer system 202 may function as a server to receive requests or information from the processor-based systems 206. In some implementations, each of the user processor-based systems 206 may operate independently of the service provider server computing system 202 (e.g., as multi-masters). In some implementations, the service provider server computing system 202 may not be utilized at all, and the system may be implemented utilizing two or more processor-based devices associated with the user, which may include one or more cloud-based storage devices.

The networked environment 200 may employ other computer systems and network equipment, for example, additional servers, proxy servers, firewalls, routers and/or bridges. The service provider server computer systems 202 will at times be referred to in the singular herein, but this is not intended to limit the implementations to a single device since in typical implementations there may be more than one service provider server computer systems 202 involved. Unless described otherwise, the construction and operation of the various blocks shown in FIG. 2 are of conventional design. As a result, such blocks need not be described in further detail herein, as they will be understood by those skilled in the relevant art.

The service provider server computer systems 202 may include one or more processing units 212a, 212b (collectively 212), a system memory 214 and a system bus 216 that couples various system components, including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the service provider server computer system(s) 202, such as during start-up.

The service provider server computer systems 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the service provider server computer system 202. Although the depicted service provider server computer systems 202 is illustrated employing a hard disk drive 224, optical disk drive 228 and magnetic disk drive 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. The system memory 214 may also include communications programs, for example, a server 244 that causes the service provider server computer system 202 to serve electronic information or files via the Internet, intranets, extranets, telecommunications networks, or other networks as described below. The server 244 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 2 as being stored in the system memory 214, the operating system 236, application programs 238, other programs/modules 240, program data 242 and server 244 can be stored on the hard disk 226 of the hard disk drive 224, the optical disk 232 of the optical disk drive 228 and/or the magnetic disk 234 of the magnetic disk drive 230.

An operator can enter commands and information into the service provider server computer system(s) 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The service provider server computer system(s) 202 can include other output devices, such as speakers, printers, etc.

The service provider server computer systems 202 can operate in a networked environment 200 using logical connections to one or more remote computers and/or devices. For example, the service provider server computer systems 202 can operate in a networked environment 200 using logical connections to one or more processor-based systems 206. Communications may be via a wired and/or wireless network architecture, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the service provider server computer systems 202 and the processor-based systems 206.

The user processor-based systems 206 will typically take the form of end user processor-based devices, for instance, personal computers (e.g., desktop or laptop computers), netbook computers, tablet computers, smartphones, personal digital assistants, cameras, gaming consoles, wearable computers (e.g., smart watches) set-top boxes, workstation computers and/or mainframe computers, and the like, executing appropriate instructions. These processor-based systems 206 may be communicatively coupled to one or more server computers. For instance, processor-based systems 206 may be communicatively coupled externally via one or more end user client entity server computers (not shown), which may implement a firewall. The server computers 202 may execute a set of server instructions to function as a server for a number of processor-based systems 206 (e.g., clients) communicatively coupled via a LAN at a facility or site, and thus act as intermediaries between the processor-based systems 206 and the service provider server computer system(s) 202. The processor-based systems 206 may execute a set of client instructions to function as a client of the server computer(s), which are communicatively coupled via a WAN.

The processor-based systems 206 may include one or more processing units 268, system memories 269 and a system bus (not shown) that couples various system components including the system memory 269 to the processing unit 268. The processor-based systems 206 will at times each be referred to in the singular herein, but this is not intended to limit the implementations to a single processor-based systems 206. In typical implementations, there may be more than one processor-based system 206 and there will likely be a large number of processor-based systems 206.

The processing unit 268 may be any logic processing unit, such as one or more central processing units (CPUs), digital signal processors (DSPs), application-specific integrated circuits (ASICs), field programmable gate arrays (FPGAs), graphical processing units (GPUs), etc. Non-limiting examples of commercially available computer systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, a 68xxx series microprocessor from Motorola Corporation, an ATOM processor, a Snapdragon processor from Qualcomm, an Exynos processor from Samsung, or an Ax processor from Apple. Unless described otherwise, the construction and operation of the various blocks of the processor-based systems 206 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270 and random access memory ("RAM") 272. A basic input/output system ("BIOS") 271, which can form part of the ROM 270, contains basic routines that help transfer information between elements within the end user client computer systems 206, such as during start-up.

The processor-based systems 206 may also include one or more media drives 273, e.g., a hard disk drive, magnetic disk drive, WORM drive, and/or optical disk drive, for reading from and writing to computer-readable storage media 274, e.g., hard disk, optical disks, and/or magnetic disks. The nontransitory computer-readable storage media 274 may, for example, take the form of removable media. For example, hard disks may take the form of a Winchester drive, and optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated nontransitory computer-readable storage media 274, provide nonvolatile storage of computer readable instructions, data structures, program modules and other data for the processor-based systems 206. Although described as employing computer-readable storage media 274 such as hard disks, optical disks and magnetic disks, those skilled in the relevant art will appreciate that processor-based systems 206 may employ other types of nontransitory computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital files or data or metadata related to such can be stored in the nontransitory computer-readable storage media 274.

Program modules, such as an operating system, one or more application programs, other programs or modules and program data, can be stored in the system memory 269. Program modules may include instructions for accessing a Website, extranet site or other site or services (e.g., Web services) and associated WebPages, other pages, screens or services hosted by the service provider server computer system 114.

In particular, the system memory 269 may include communications programs that permit the processor-based systems 206 to exchange electronic or digital information or files or data or metadata with the service provider server computer system 202. The communications programs may, for example, be a Web client or browser that permits the processor-based systems 206 to access and exchange information, files, data and/or metadata with sources such as Web sites of the Internet, corporate intranets, extranets, or other networks. Such may require that the processor-based systems 206 have sufficient right, permission, privilege or authority for accessing a given Website, for example, one hosted by the service provider sever computer system(s) 202. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/modules, program data and/or browser can be stored on the computer-readable storage media 274 of the media drive(s) 273. An operator can enter commands and information into the processor-based systems 206 via a user interface 275 through input devices such as a touch screen or keyboard 276 and/or a pointing device 277 such as a mouse. Other input devices can include a microphone, joystick, game pad, tablet, imager, scanner, etc. These and other input devices are connected to the processing unit 268 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The processor-based systems 206 can include other output devices, such as speakers, printers, etc.

Referring now to FIGS. 3-14, implementations of the present disclosure provide systems and methods to generate overlays on a calendar associated with a media library of one or more file types (e.g., photos, videos, documents). The functionality discussed below may be provided by one or more processors associated with one or more processor-based devices, such as the processor-based devices discussed above with reference to FIGS. 1 and 2.

As discussed further below, at least some of the implementations of the present disclosure provide a GUI-based calendar view which provides a unique and intuitive way for users to view their media objects (e.g., photos, videos) which are stored on one or more processor-based devices. In at least some implementations, the calendar view may be a completely automated view which populates based off of the metadata (e.g., creation date, user ratings, textual information) of media objects within the user's media library. As noted above, such media objects may be stored across multiple local and/or remote processor-based devices. In at least some implementations, the calendar view presents media objects by decade, year, month, week, or day. By simply using a mouse or finger, a user can see their photos by day, and can remember where they were and what they were doing on any specific day for which they have photos.

In at least some implementations, at least one processor of a processor-based device may overlay generated "events" (e.g., based on a query or container) on a GUI-based calendar which is viewable according to numerous views, such as a month view, year view, decade view, etc. As discussed further below, in at least some implementations, concurrent with the generation of each event, the system generates a "smart album" of objects which presents the objects in the media library that fall within the indicated or autonomously determined time span associated with the event. The smart album view creates a "walk-through" timeline of the user's date-range smart albums.

As discussed above, events may be generated in multiple ways. In addition to being generated manually via a query, a user may select one or more existing containers and designate such as a calendar event. Additionally or alternatively, the system may autonomously generate events based on existing or created containers. The system may autonomously extract the date range from the metadata of the media objects contained within the one or more containers and may autonomously generate one or more overlays on a calendar on the appropriate dates or across a range of dates. Thus, in such instances, the user need not manually enter any date ranges, as the date range for the event may be dynamically determined based on the present contents of the one or more containers associated with the event. That is, the date range for such event may vary dynamically as media files are added or removed from the one or more containers. Generally, any container of media files may be added as a calendar event, or a user may also create events manually.

As an example, a user may specify an event titled "college years" which spans multiple years (e.g., four years, eight years). Such may be specified in the form of a query which identifies one or more characteristics of media objects including, but not limited to, creation date, media type, keyword(s), rating, etc. As another example, the user may specify a "Fall 2016" event which spans three months. In some implementations, events may be assigned to categories, such as travel, vacation, holidays, family, friends, work, etc. Events may be nested within other events. For example, a user may generate a parent event "Education", a child event "High School" (within "Education") and a grandchild event "Freshman year" (within "High School" which is within "Education"), and so on.

As discussed further below, in some implementations the user may be permitted to imprecisely specify the date range for an event. For example, the user may be able to specify a decade (e.g., 1980's), a year (e.g., 2015), or a month (e.g., April 2016) rather than providing a precise day for the beginning and end of a date range for an event. In some implementations, the user may be able to input a precise start date for an event and an imprecise end date for the event, or vice versa. For example, a user may input that an event begins in the 1980's (imprecise date) and ends on Jul. 4, 1995 (precise date). Such feature may be advantageous for situations wherein the user does not readily recall the precise start and/or end date of an event. As an example, a user may simply recall and input that a recent trip occurred in March, without having to specify precise dates.

Figure 3:
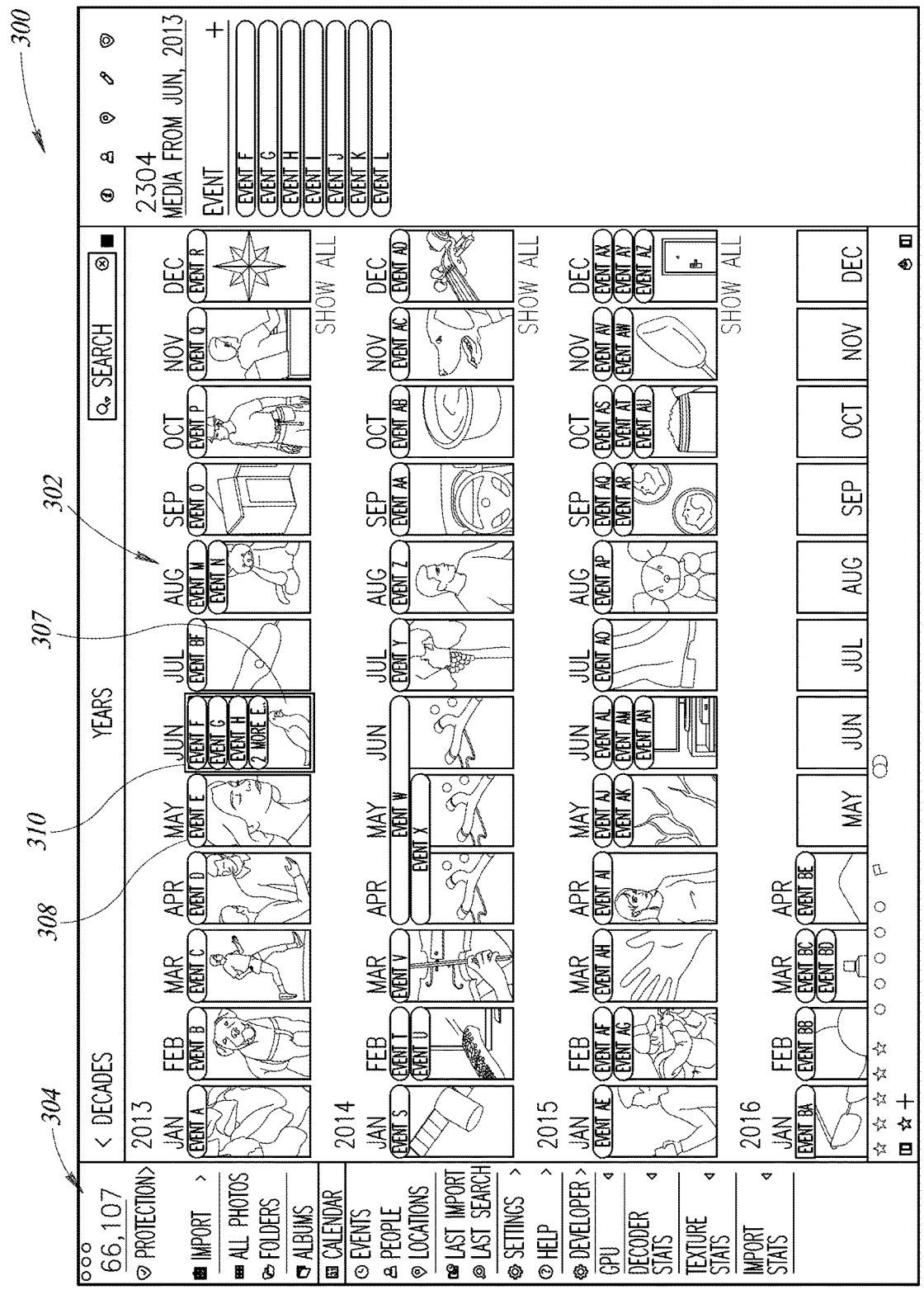
FIG. 3 is a screenshot of a graphical user interface of the object management and presentation system showing a year calendar view of a calendar, according to one illustrated implementation.

FIG. 3 is a screenshot 300 of a graphical user interface of the object management and presentation system showing a year calendar view of a calendar 302. The year calendar view 302 may be selected from a list 304 provided on a left panel of the GUI, for example. In the example shown, the years 2013, 2014 and 2015 are displayed. Below each year, a row of the 12 months of the respective year is displayed. Below the title for each month there is shown one or more images 307 which are representative of one or more of the media objects which have a creation date within the particular month.

For each month having at least one event which has a date range that overlaps with the month, one or more selectable event indicators 308 are overlaid on the image 307 for the month. For example, May 2013 is shown as having one selectable event indicator 308, August 2013 is shown as having two selectable event indicators, and June 2013 is shown as having five selectable event indicators. Due to space restrictions, only three of the five events in June 2013 are represented by event indicators, and a selectable indicator 310 labeled "2 more events" is provided to notify the user that additional events are associated with the month of June 2013. As discussed above, in some implementations individual overlays may be provided only on months in which media files associated with the event were created.

In some implementations, when two or more events span a particular month (e.g., June 2013), the order of the selectable event indicators 308 may be determined based at least in part on a priority of the category of the event and/or the priority of the event. For example, categories may be prioritized autonomously by the system or may be based on user-defined criteria, for example. Additionally, parent events may be prioritized relative to child events (or sub-events).

Display of the selectable event indicators 308 may also be sorted by event duration. For example, for two overlapping events which include a first event having a relatively short duration and a second event having a relatively long duration, the event indicator 308 for the event having the shorter (or longer) duration may be displayed above the event indicator for the event having the longer (or shorter) duration.

In some implementations, the selectable event indicators 308 may be coded (e.g., color, shape) to allow the user to quickly see what types of events occurred on particular dates or date ranges. In some implementations, the event indicators 308 are color coded by category.

For each month in the year view shown in FIG. 3, the representative image(s) 307 displayed may be determined by heuristics and algorithms which extract creation dates from the media objects and sort them automatically in the calendar view. Which images are shown in the calendar view may be controlled by heuristics including, but not limited to, user rating of the media objects broken down by decade and year, and accurately displayed in calendar months.

Figure 4:
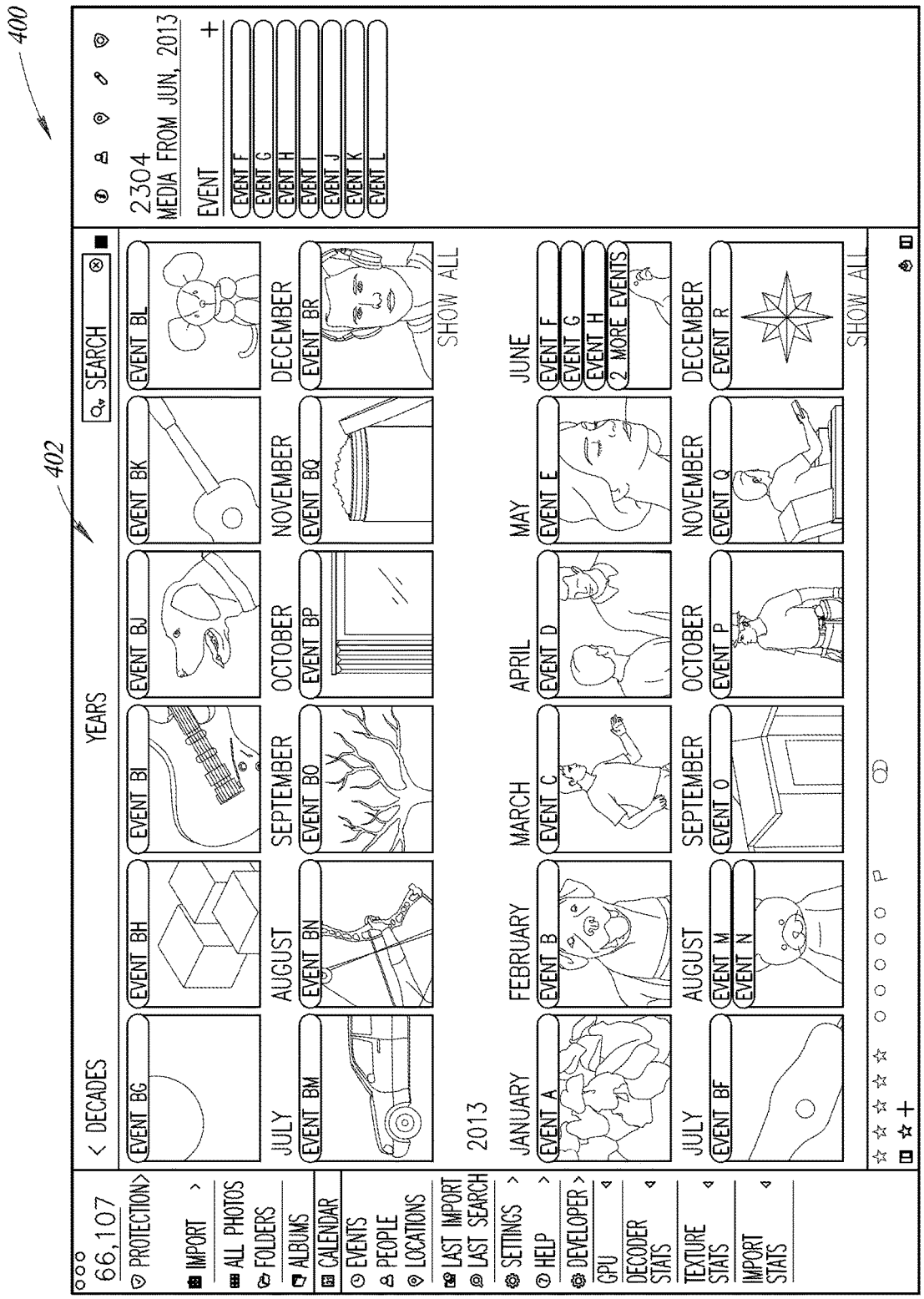
FIG. 4 is a screenshot of a graphical user interface of the object management and presentation system showing another year calendar view of a calendar, according to one illustrated implementation.

FIG. 4 is a screenshot 400 of a graphical user interface of the object management and presentation system showing a year calendar view 402 of a calendar. The screenshot 400 is similar to the view shown in FIG. 3, except that under each year there are two rows of six months each rather than a single row of 12 months. In operation, the user may specify how the year calendar view is displayed or the display of the year calendar view may be autonomously determined based on one or more criteria, such as screen size of the processor-based device on which the user is viewing the calendar view.

Figure 5:
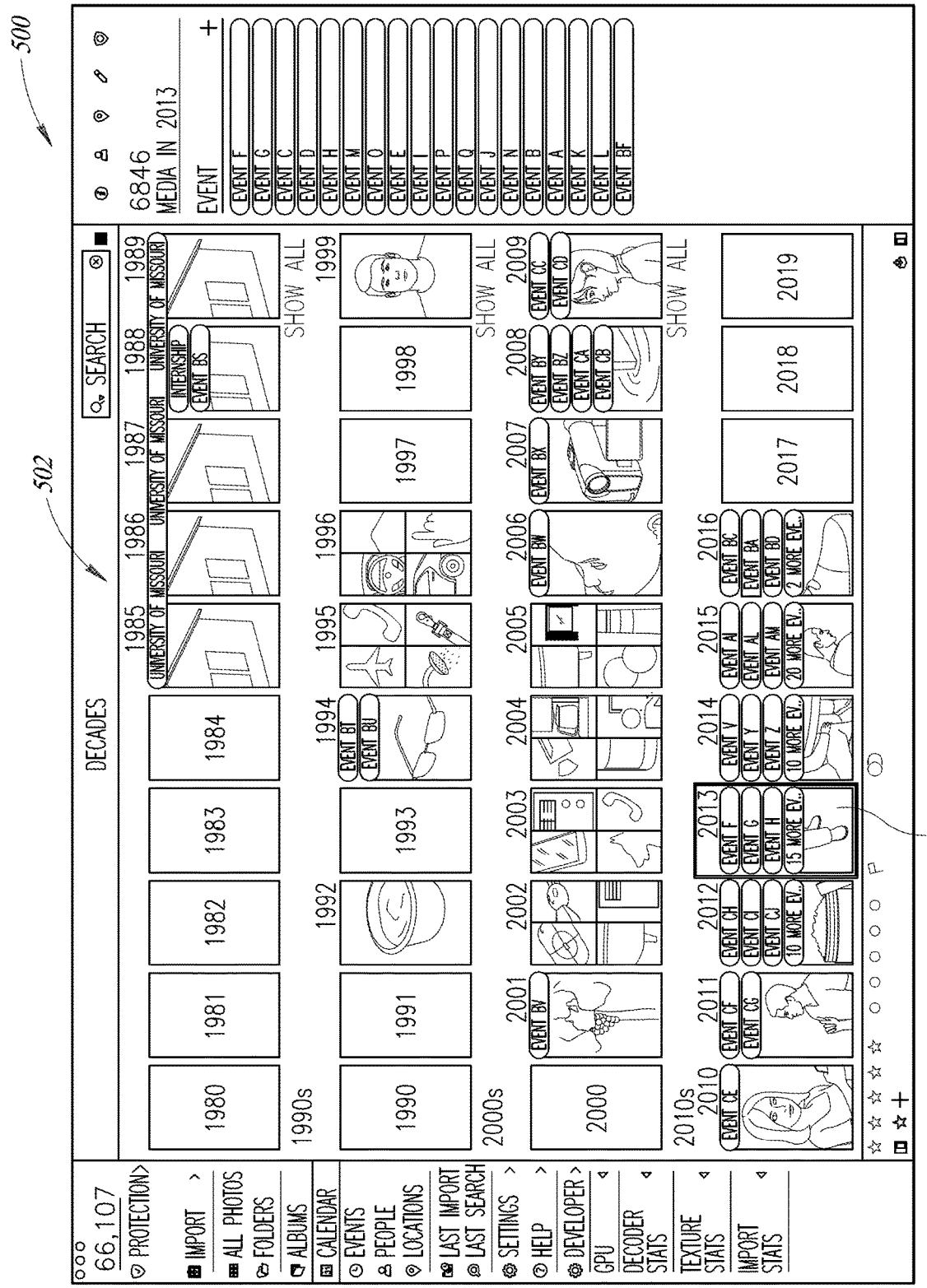
FIG. 5 is a screenshot of a graphical user interface of the object management and presentation system showing a decade calendar view of a calendar, according to one illustrated implementation.

FIG. 5 is a screenshot 500 of a graphical user interface of the object management and presentation system showing a decade calendar view 502 of a calendar. In the decade calendar view 502, below each decade (e.g., 1990s, 2000s) is a row of 10 years corresponding to the 10 years of that decade. For each year in the decade calendar view 502, one or more representative images 504 may be shown. As discussed above, which particular images 504 are shown for each year may be controlled by heuristics including user rating of the media objects, etc.

Figure 6:
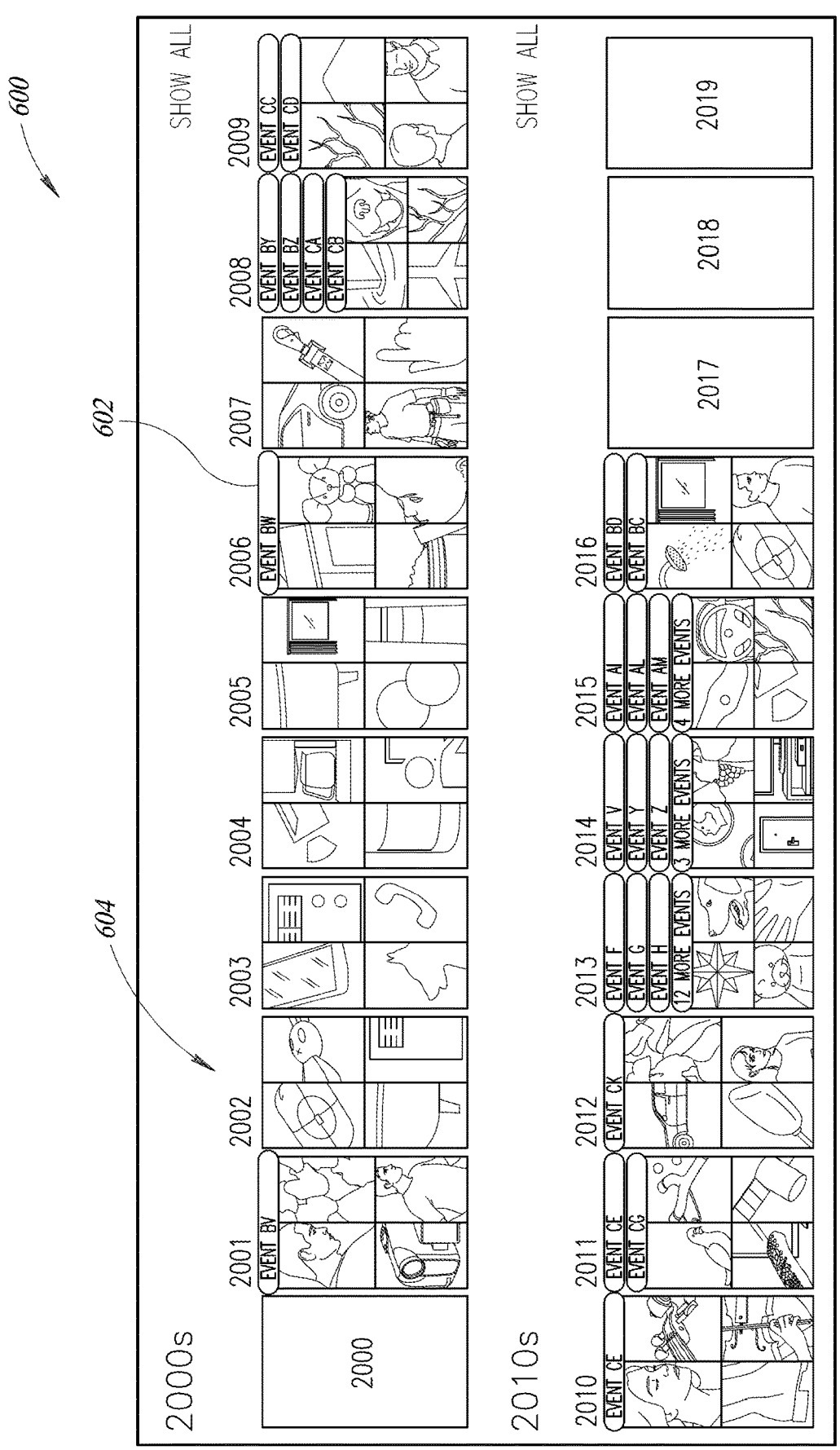
FIG. 6 is a screenshot of a graphical user interface of the object management and presentation system showing multiple event indicators overlaid on a calendar, according to one illustrated implementation.

FIG. 6 is a screenshot 600 of a graphical user interface of the object management and presentation system showing multiple event indicators 602 overlaid on a calendar 604. As shown, multiple date-range event indicators 602 (e.g., colored bars) are overlaid on the calendar 604 and are dynamically displayed based on heuristics. Such heuristics may include, but are not limited to, priority of an event, category of an event, time range of an event, overflow events, and/or the space available on the screen of a processor-based device on which the user is running the data storage and presentation application.

Figure 7:
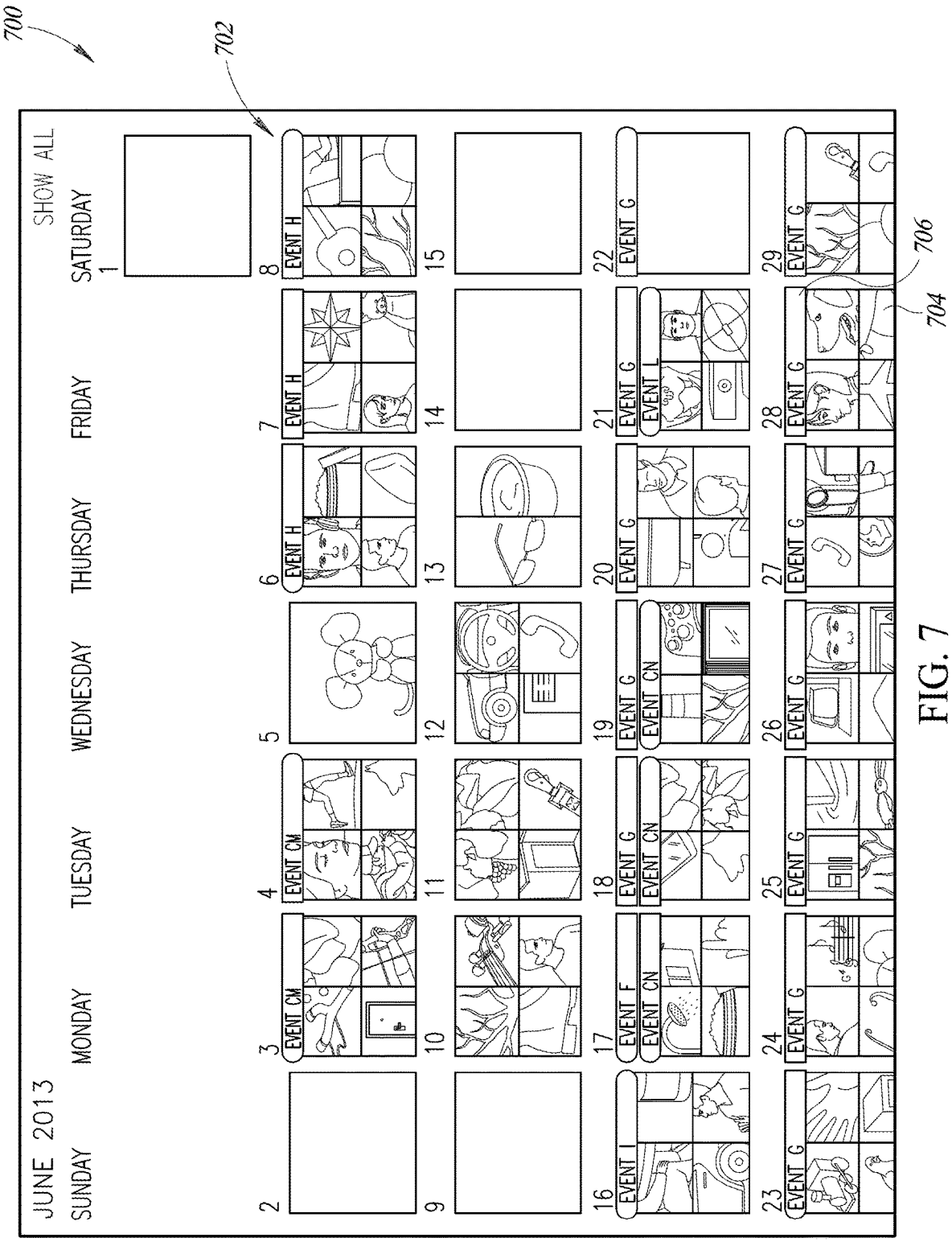
FIG. 7 is a screenshot of a graphical user interface of the object management and presentation system showing a month calendar view of a calendar, according to one illustrated implementation.

FIG. 7 is a screenshot 700 of a graphical user interface of the object management and presentation system showing a month calendar view 702 for the month of June 2013. In the month calendar view 702, below the month are rows of weeks, each row comprising the seven days in the particular week. For each day in the month calendar view, one or more representative images 704 may be shown. As discussed above, which particular images are shown for each year may be controlled by heuristics including user rating of the media objects, etc. Multiple event indicators 706 are overlaid on the days shown in the month calendar view 702. The event indicators 706 may be dynamically displayed based on heuristics, as discussed above.

Figure 8A:
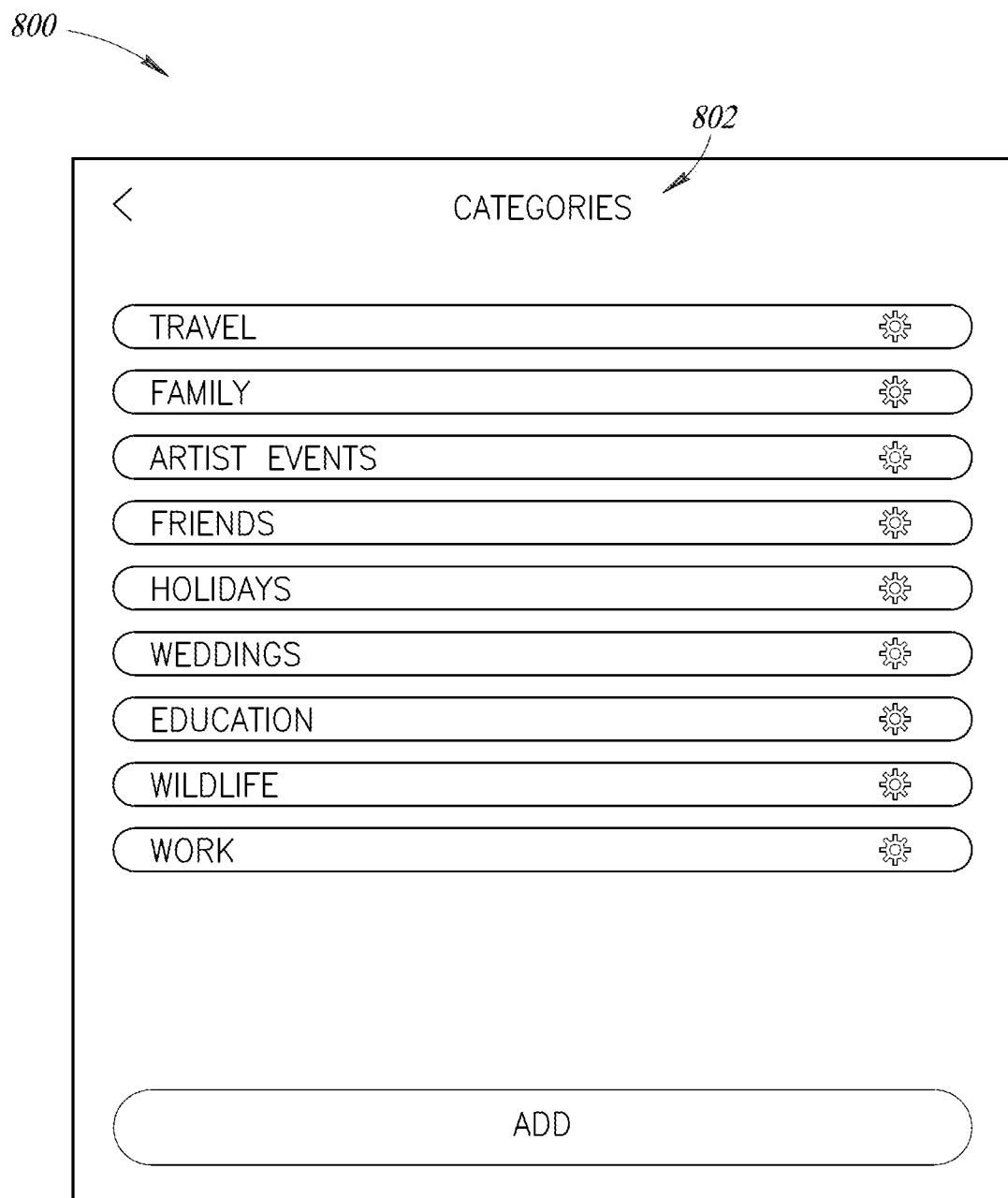
FIG. 8A-8B are screenshots of a graphical user interface of the object management and presentation system showing category picker interface for a date-range event, according to one illustrated implementation.
Figure 8B:
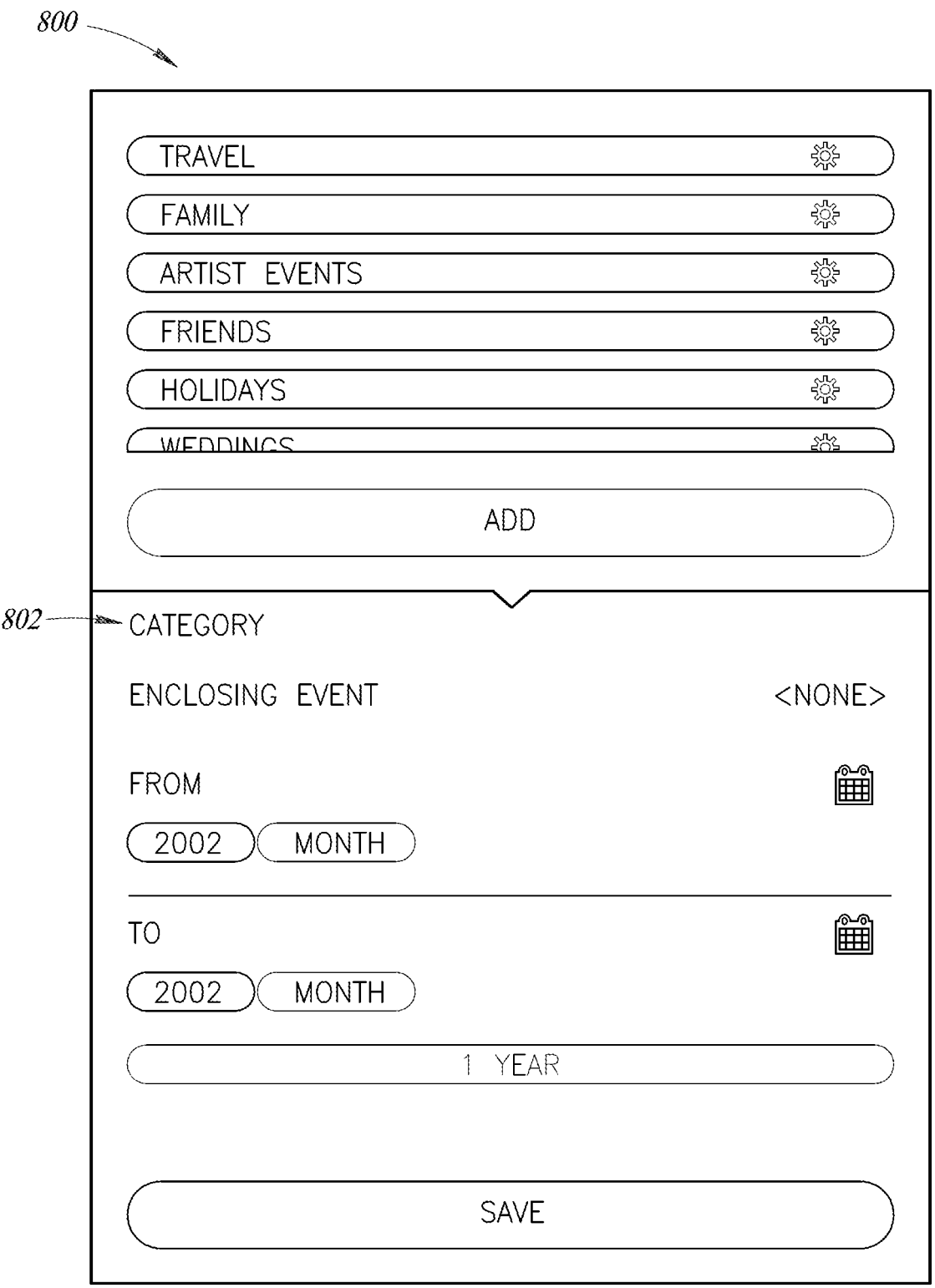

FIGS. 8A and 8B are screenshots 800 of a graphical user interface of the object management and presentation system showing category picker user interface 802 for an event. The category picker user interface 802 may include a list of categories (e.g., travel, artist events, education, family, friends, holidays, weddings) from which the user may associate a new or existing event. The user may also create new categories or delete existing categories. As discussed above, each category may have a priority associated therewith which may be used to dynamically determine how the event indicators for the event are displayed in the various calendar views. The priority for a category may be set by the user (see FIG. 13) and/or may be set autonomously by the application.

Figure 9:
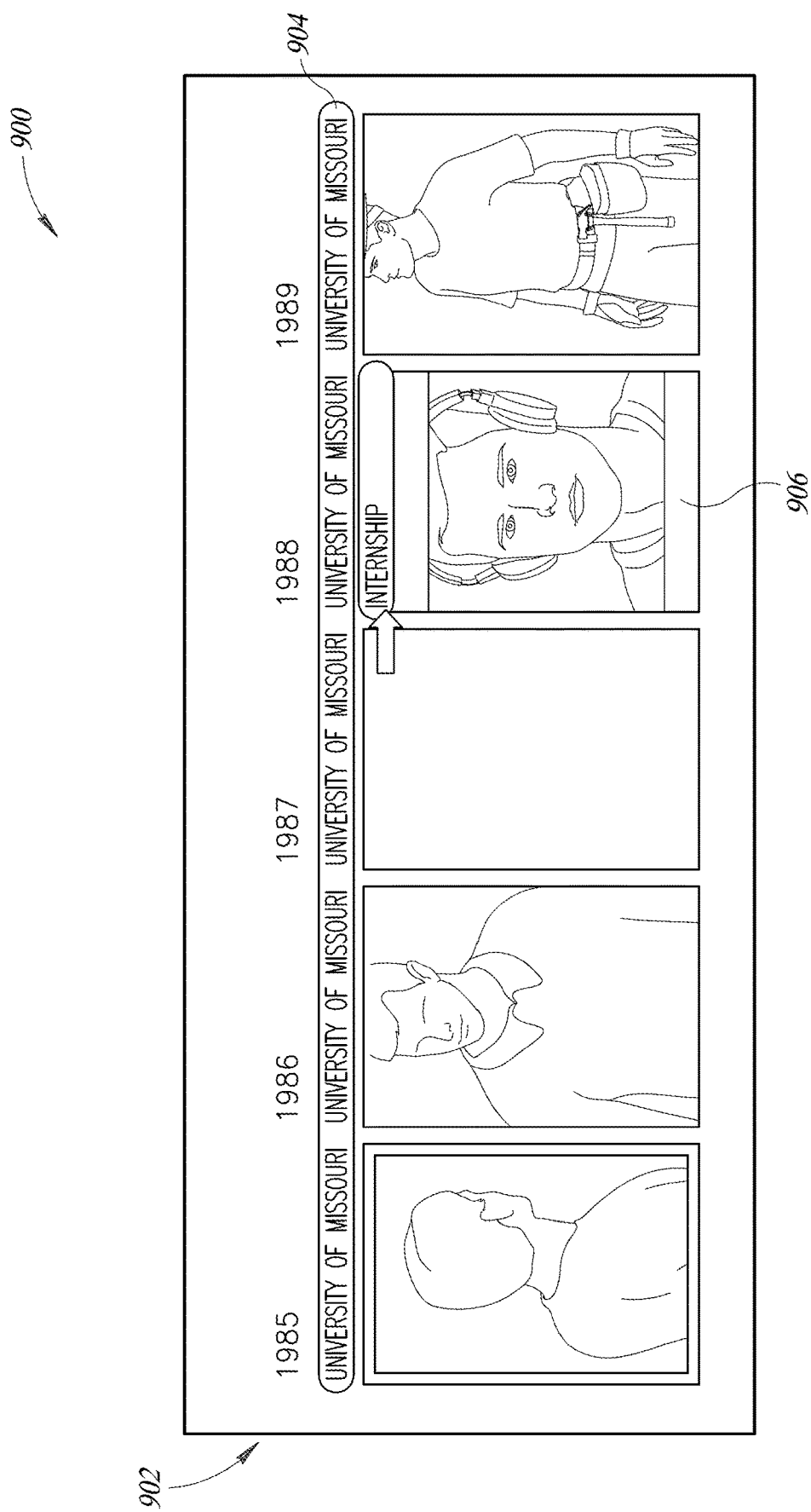
FIG. 9 is a screenshot of a graphical user interface of the object management and presentation system showing a detailed view of two events shown on a decade calendar view of a calendar, according to one illustrated implementation.

FIG. 9 is a screenshot 900 of a graphical user interface of the object management and presentation system showing a detailed view of two events shown on a decade view 902 of a calendar. As shown, a parent event 904 titled "University of Missouri" has a date range of 1985 to 1989, which may be representative of the college years of a user. A child event 906 titled "Internship" has a date range of 1988, which may be representative of the date range of an internship held by the user during their college years.

Generally, the system allows users to designate new events as parent events or child events. In at least some implementations, the date range for parent events may extend beyond the date range of child events, but parent events cannot be shorter than the child event(s) inside the parent events. For example, if a parent event spans between 1985 and 1989, a child event may span between 1986 and 1988 but, in this example, the parent event cannot be edited to span less than 1986-1988, as the parent must be as least as long as the sum of the child events.

In at least some implementations, the date range of parent events may be extended by child events. For example, a user may create a parent event named "Education" which spans between 1970 and 1983. The user may subsequently create an event named "College Years" which is a child event for the event "Education." If the "College Years" child event spans from 1985 to 1990, the parent event "Education" may be autonomously extended to span between 1970 and 1990.

In some implementations, multiple child events may overlap each other. For example, a parent event having date range of 1985 to 1989 may have a first child event which spans 1986 to 1988 and a second child even which spans 1987. Such feature allows for a unique hybrid "rollup" of child events which follows a human-based thought process instead of a strict adherence to a rule that parent events cannot be longer than the sum of their child events. As discussed above, each child event may have one or more events which are children of the child event, and so on.

Upon creation of a date-range event on the calendar, an event smart album associated with the event is autonomously generated. The event smart album contains any media objects in the specified date range of the generated event. In some implementations, filtering (e.g., hard keyword filtering, soft keyword filtering) may be provided to allow refinement of which media objects associated with the date range of the event are displayed in the generated event smart album.

Figure 10:
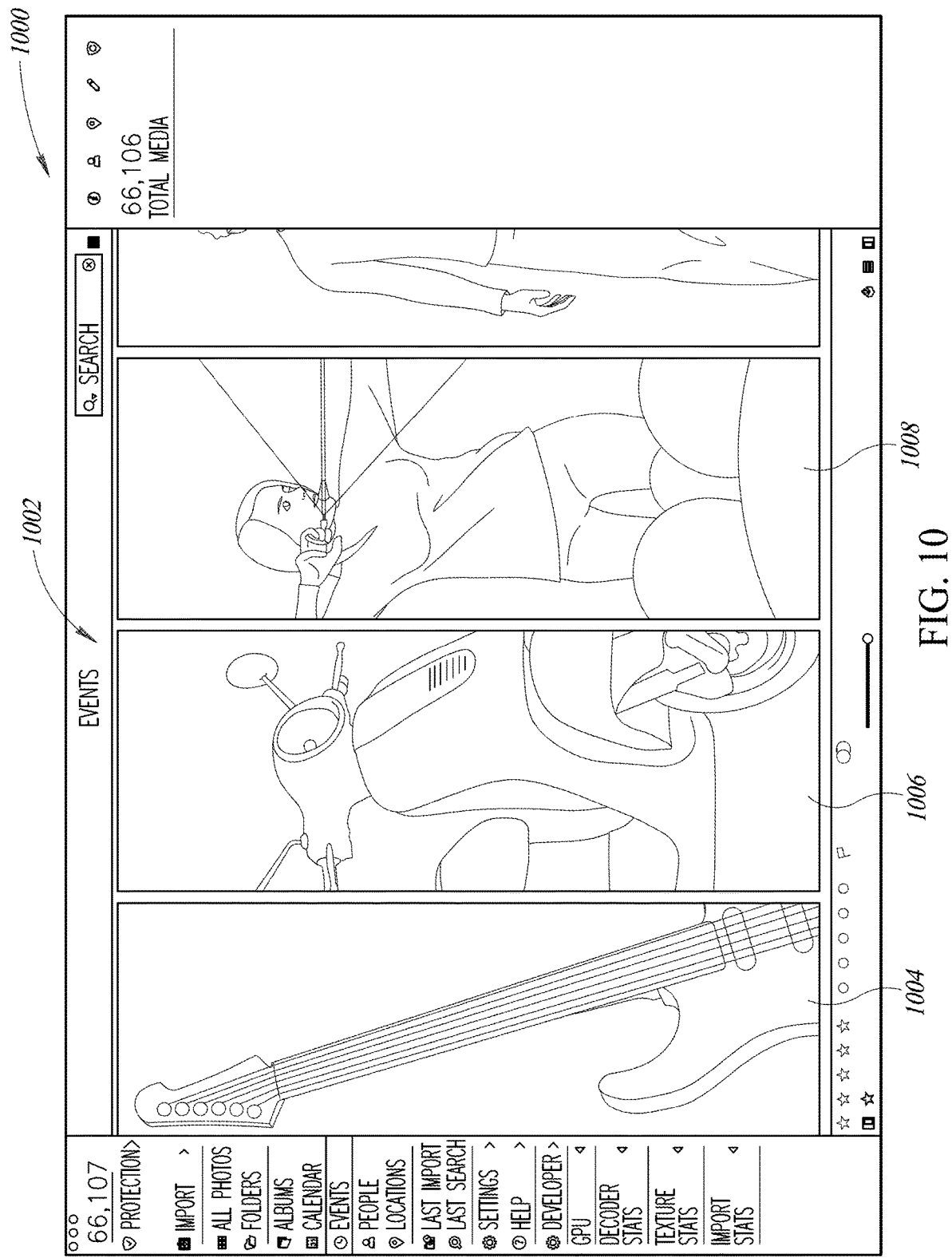
FIG. 10 is a screenshot of a graphical user interface of the object management and presentation system showing an events view of a calendar, according to one illustrated implementation.

FIG. 10 is a screenshot 1000 of a graphical user interface of the object management and presentation system showing an events view 1002 of a calendar. The events view 1002 displays one or more event smart albums (three albums 1004, 1006 and 1008 shown) in a horizontal timeline which is navigable by the user to provide a "walk-through" timeline of the smart albums 1004, 1006 and 1008. As discussed above, each event smart album may be graphically represented in the events view 1002 by one or more images representative of the media objects associated with the event. Which image(s) is displayed may be determined by heuristics, as discussed above with reference to the calendar views.

Figure 11:
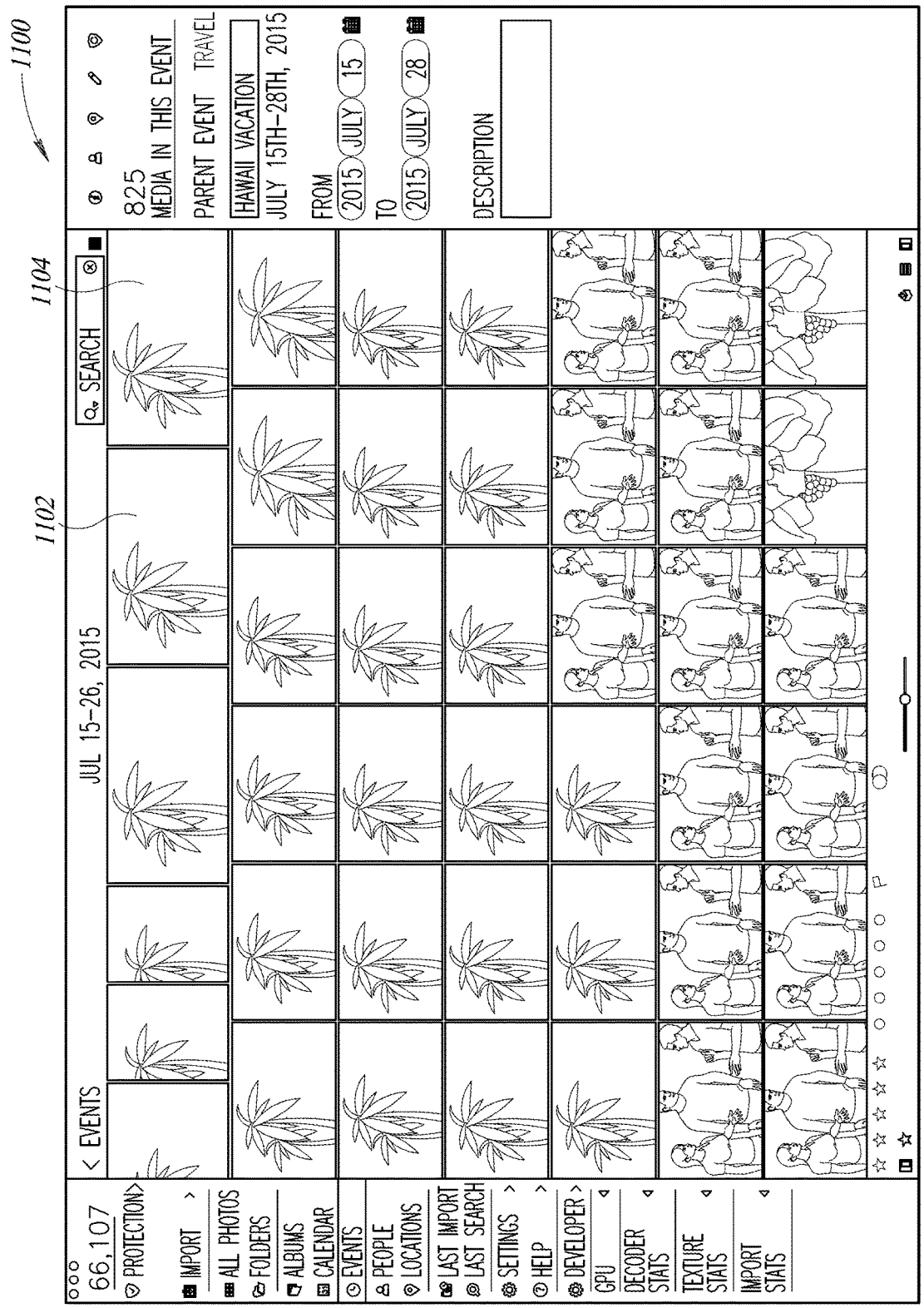
FIG. 11 is a screenshot of a graphical user interface of the object management and presentation system showing a smart album grid view, according to one illustrated implementation.

FIG. 11 is a screenshot 1100 of a graphical user interface of the object management and presentation system showing a smart album grid view 1102. The smart album grid view 1102 displays images 1104 of all files within the date range of the associated event regardless of what individual folders or locations the media objects may exist in on the user's processor-based devices.

FIG. 12 shows an event generation interface 1200 which allows the user to generate an event using any combination of imprecise dates and precise dates. For example, an event may span a decade (e.g., 1980s), a year (e.g., 2016), a month of a year (e.g., April 2016), or a day of a year (e.g., Apr. 10, 2016).

As a first non-limiting example, a start date for an event may be specified by a decade and an end date for the event may also be specified by a decade. In this example, a user may specify an event as beginning in the 1980s and ending in the 1990s. Upon input of such start and end dates, the application may autonomously set the date range for the event as Jan. 1, 1980 to Dec. 31, 1999 without requiring the user to specify precise dates.

As a second non-limiting example, a start date for an event may be specified by a decade and an end date may be specified by a year. In this example, a user may specify an event as beginning in the 1980s and ending in 1995. Upon input of such start and end dates, the application may autonomously set the date range for the event as Jan. 1, 1980 to Dec. 31, 1995 without requiring the user to specify precise dates.

As a third non-limiting example, a start date for an event may be specified by a decade and an end date may be specified by a year and month. In this example, a user may specify an event as beginning in the 1980s and ending in July of 1995. Upon input of such start and end dates, the application may autonomously set the date range for the event as Jan. 1, 1980 to Jul. 31, 1995 without requiring the user to specify precise dates.

As a fourth non-limiting example, a start date for an event may be specified by a decade and an end date may be specified by a year, month and day. In this example, a user may specify an event as beginning in the 1980s and ending on Jul. 4, 1995. Upon input of such start and end dates, the application may autonomously set the date range for the event as Jan. 1, 1980 to Jul. 4, 1995 without requiring the user to specify precise dates.

Figure 13:
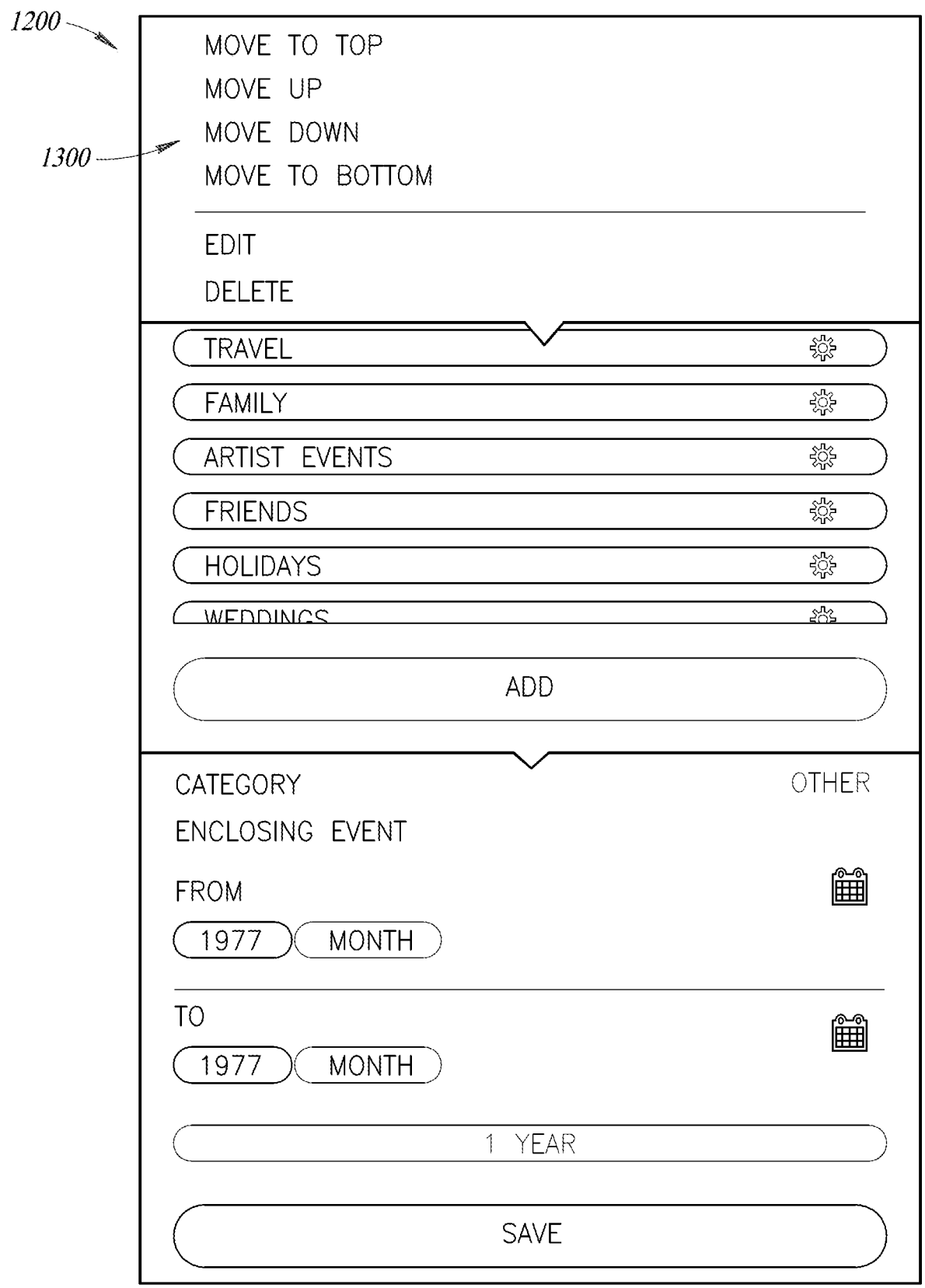
FIG. 13 is a screenshot of a graphical user interface of the object management and presentation system showing priority settings interface of the event generation interface, according to one illustrated implementation.

FIG. 13 shows a priority setting interface 1300 which may be provided as part of the event generation interface 1200 to allow the user to manually set a priority for a new or existing event. In the illustrated example, options are provided to move the priority of a category to the top or bottom of the list of categories, or to move the priority of a category up or down relative other categories in the list of categories. As discussed above, such priority setting may be used by the application to determine an order in which event indicators for the event are displayed in the various calendar views.

As discussed above, after a user imports media objects into the application, algorithms autonomously create a calendar view which represents an actual calendar. In most instances, a user will have many multiples of media objects associated with an individual year, month or day. At least some of the implementations of the present disclosure utilize heuristics to scan the media objects in a media library and, using the heuristics, determine a relevant one or more photos to display autonomously as the representation of media objects in that particular year, month or day range. Advantageously, the heuristics described herein cause the most relevant images of the media objects to "surface to the top" of each of the calendar views and the event smart album view.

Figure 14:
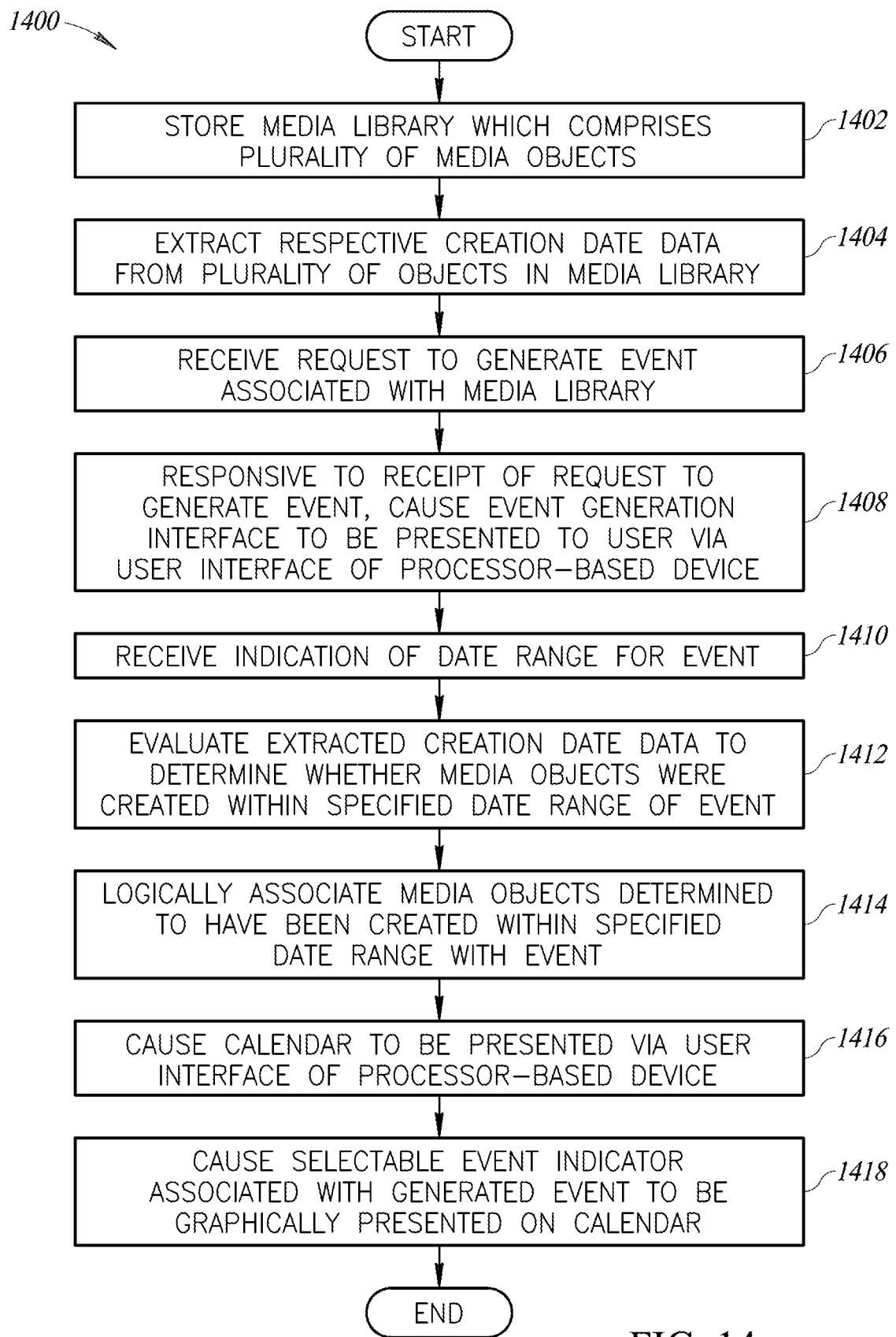
FIG. 14 is a flow diagram of a method of operating an object management and presentation system, according to one illustrated implementation.

FIG. 14 is a flow diagram of a method 1400 of operation for a data storage system to present a plurality of objects stored across a plurality of processor-based devices to a user operating at least one processor-based device. The method 1400 may be performed by one or more of the processor-based devices shown in FIGS. 1 and 2 associated with the data storage system, for example.

At 1402, at least one processor of the data storage system may store a media library which comprises a plurality of media objects in at least one nontransitory processor-readable storage medium communicatively coupled to the at least one processor. The media library may include a plurality of media objects stored on at least two nontransitory processor-readable storage media associated with a respective at least two computing devices, for example. The media objects may also include at least two or more media object types (e.g., image media objects, video media objects, document media objects) in some instances.

At 1404, the at least one processor may extract respective creation date data from each of the plurality of objects in the media library. For example, such creation date data may be contained in metadata associated with the media objects. In some implementations, the at least one processor may allow users to modify creation dates of media objects. Such feature may be useful, for example, when the creation date of a media object does not correspond to the actual creation date of the media object (e.g., scanned images).

At 1406, the at least one processor may receive a request to generate a date-range event associated with the media library from the at least one processor via a user interface of the processor-based device. At 1408, responsive to receiving the request to generate an event, the at least one processor may cause an event generation interface to be presented to a user via the user interface of the processor-based device. The event generation interface includes a request for input of a date range of the event.

As discussed above, in at least some implementations, rather than receiving input of a date range of the event, the system may receive an indication of one or more containers which are to be associated with the event. For example, a user may already have media files associated with a birthday party stored in one or more containers (e.g., folders, albums). In such instances, the user may simply identify the container when generating a "birthday party" event, and the system may autonomously extract the creation dates from the meta data of the media files in the one or more containers to determine the date range for the event. In such instances, the date range for the event may dynamically vary as media files are added or removed from the one or more containers associated with the event.

Additionally or alternatively, rather than receiving input of a date range of the event, the system may receive a query with specifies other criteria (e.g., "Panoramic" images), and may generate an event based on such query, as discussed above.

At 1410, the at least one processor may receive an indication of the date range for the event via the user interface of the processor-based device. For example, the at least one processor may receive a start day and an end day for the event via input from a user. As another example, rather than precise start and/or end dates, the at least one processor may receive an imprecise date range (e.g., decade, year, month, season) input by the user. In some instances, the at least one processor may receive a start day and an end day for the event, and at least one of the start day and the end day may be imprecisely specified by the user by decade, year or month (e.g., 1990s, 1995, June).

At 1412, for each of the plurality of media objects in the media library, the at least one processor may evaluate the extracted creation date data associated with the media object to determine whether the media object was created within the specified date range of the event. At 1414, the at least one processor may logically associate media objects determined to have been created within the specified date range of the event with the event in the at least one nontransitory processor-readable storage medium communicatively coupled to the at least one processor.

At 1416, the at least one processor may cause a calendar to be graphically presented via the user interface of the processor-based device. At 1418, the at least one processor may cause a selectable event indicator (e.g., colored bar) associated with the generated event to be graphically presented on the calendar. The selectable event indicator may be sized and positioned on the calendar to be associated with at least one of a date or a date range displayed by the calendar, as shown in FIGS. 3-7.

For example, the at least one processor may cause a number of years to be presented on the calendar in a decade view. In such instances, the at least one processor may cause the selectable event indicator to be associated with each of the number of years presented on the calendar which overlap with the date range of the event. As another example, the at least one processor may cause a number of months to be presented on the calendar in a year view. In such instances, the at least one processor may cause the selectable event indicator to be associated with each of the number of months presented on the calendar which overlap with the date range of the event. As another example, the at least one processor may cause a number of days to be presented on the calendar in a month view. In such instances, the at least one processor may cause the selectable event indicator to be associated with each of the number of days presented on the calendar which overlap with the date range of the event.

In at least some implementations, the at least one processor may receive an indication of a selection of a selectable event indicator by a user via the user interface of the user's processor-based device. Responsive to receiving the indication of a selection of the selectable event indicator, the at least one processor may cause a presentation of the media objects associated with the generated event on the user interface of the user's processor-based device.

In at least some implementations, each of the plurality of events is associated with at least one category. In such instances, the at least one processor may cause a plurality of selectable event indicators to be graphically presented on the calendar in an order determined at least in part on the respective categories of each of the plurality of events.

The at least one processor may cause a graphical representation of at least one media object associated with the event to be displayed on the calendar. The graphical representation of the at least one media object may be positioned or located on a particular day, month, year or decade displayed on the calendar which overlaps with the date range of the event. In some instances, the at least one processor may determine which of the at least one media object associated with the event to display on the calendar based at least in part on one or more criteria. Such criteria may include a user rating, a tag, text associated with the media object, viewing information for the media object, editing information for the media object, sharing information the media object, or a creation date for the media object, for example.

Such criteria may indicate which media objects are more relevant or important to the user. For example, if the application detects that the user has recently edited, shared, rated, etc., a media object in a group of media objects, the application may determine that such media object is more relevant than media objects which have not been recently edited, shared, rated, etc.

In at least some implementations, the at least one processor may generate an event smart album associated with the event. The event smart album may include each of the media objects associated with the generated event. The at least one processor may further cause the generated event smart album to be graphically presented by the user interface of the processor-based device in a timeline which includes a plurality of event smart albums sorted based at least in part on the respective date ranges of the plurality of event smart albums. The at least one processor may cause a graphical representation of at least one media object associated with each of the event smart albums to be graphically presented by the user interface of the processor-based device.

Further, in some implementations, the at least one processor may determine which of the at least one media object associated with the event smart album to display based at least in part on one or more criteria. Such criteria may include a user rating, a tag, text associated with the media object, viewing information for the media object, editing information for the media object, sharing information the media object, or a creation date for the media object, for example.

In at least some implementations, the at least one processor may receive an indication of a parent-event for the event, and may logically associate the indicated parent-event with the event in the at least one nontransitory processor-readable storage medium. The at least one processor may determine whether the indicated event is a sub-event of another event associated with another event. Responsive to determining the indicated event is a sub-event of another event, the at least one processor may restrict a permitted date range for the event to be within a specified date range of the other event of which the indicated event is a sub-event.

In at least some implementations, the at least one processor may cause a plurality of selectable event indicators associated with a respective plurality of events to be dynamically graphically presented on the calendar. As an example, the number and order of the plurality of selectable event indicators graphically presented on the calendar may be based at least in part on a priority of the event, a date range of the event, a duration of the event, or an amount of space available on the user interface of the processor-based device.

In some implementations, the at least one processor may receive one or more filtering criteria, and responsive to such may modify which of the plurality of media objects are associated with the generated event based at least in part on the received one or more filtering criteria. The filtering criteria may include, for example, textual filtering criteria (e.g., keywords), media type filtering criteria (e.g., only photos), media content filtering criteria (e.g., includes people, includes a particular person), location-based criteria, or user rating filtering criteria.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, solid state drives, flash memory storage, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Pat. No. 9,300,737 issued on Mar. 29, 2016, and U.S. Provisional Application No. 62/339,621, filed May 20, 2016, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation for a data storage system to present a plurality of objects across a plurality of processor-based devices, the method comprising:

storing, in at least one nontransitory processor-readable storage medium of the data storage system, a media library which comprises a plurality of media objects;

extracting, by at least one processor communicatively coupled to the at least one nontransitory processor-readable storage medium, respective creation date data from each of the plurality of objects in the media library;

receiving, by the at least one processor via a user interface of at least one of the plurality of processor-based devices, a request to generate an event associated with the media library;

responsive to receiving the request to generate an event, causing, by the at least one processor, an event generation interface to be presented to a user via the user interface of the at least one of the plurality of processor-based devices, the event generation interface provides a request for a date range of the event;

receiving, by the at least one processor via the user interface of the at least one of the plurality of processor-based devices, an indication of the date range for the event, wherein the date range for the event overlaps with a date range for a previously generated event;

for each of the plurality of media objects in the media library, evaluating, by the at least one processor, the extracted creation date data to determine whether the media object was created within the specified date range of the event;

logically associating, by the at least one processor, media objects determined to have been created within the specified date range of the event with the event in the at least one nontransitory processor-readable storage medium;

dynamically adjusting the specified date range of the event responsive to the event being logically associated with an additional media object or logically disassociated from a media object;

causing, by the at least one processor, a calendar to be graphically presented via the user interface of the at least one of the plurality of processor-based devices; and causing, by the at least one processor, a selectable event indicator associated with the generated event to be graphically presented on the calendar, the selectable event indicator sized and positioned on the calendar to be associated with at least one of a date or a date range displayed by the calendar.

2. The method of claim 1 wherein receiving an indication of the date range for the event comprises receiving, by the at least one processor via the user interface of the at least one of the plurality of processor-based devices, a start day and an end day for the event.

3. The method of claim 1 wherein receiving an indication of the date range for the event comprises receiving, by the at least one processor via the user interface of the at least one of the plurality of processor-based devices, an imprecise date range.

4. The method of claim 1 wherein receiving an indication of the date range for the event comprises receiving, by the at least one processor via the user interface of the at least one of the plurality of processor-based devices, a start day and an end day for the event, at least one of the start day and the end day specified by the user by decade, year or month.

5. The method of claim 1 wherein causing a selectable event indicator associated with the generated event to be graphically presented on the calendar comprises causing the selectable event indicator to be displayed on the calendar associated with at least one of a: day, month, year or decade.

6. The method of claim 1, further comprising:

receiving, by the at least one processor via the user interface of the at least one of the plurality of processor-based devices, an indication of a selection of the selectable event indicator; and responsive to receiving the indication of a selection of the selectable event indicator, causing, by the at least one processor, a presentation of the media objects associated with the generated event on the user interface of the at least one of the plurality of processor-based devices.

7. The method of claim 1 wherein causing, by the at least one processor, a calendar to be graphically presented by the user interface of the at least one of the plurality of processor-based devices comprises causing a number of years to be presented on the calendar, and causing the selectable event indicator to be graphically presented on the calendar comprises causing the selectable event indicator to be associated with each of the number of years presented on the calendar which overlap with the date range of the event.

8. The method of claim 1 wherein causing, by the at least one processor, a calendar to be graphically presented by the user interface of the at least one of the plurality of processor-based devices comprises causing a number of months to be presented on the calendar, and causing the selectable event indicator to be graphically presented on the calendar comprises causing the selectable event indicator to be associated with each of the number of months presented on the calendar which overlap with the date range of the event.

9. The method of claim 1 wherein causing, by the at least one processor, a calendar to be graphically presented by the user interface of the at least one of the plurality of processor-based devices comprises causing a number of days to be presented on the calendar, and causing the selectable event indicator to be graphically presented on the calendar comprises causing the selectable event indicator to be associated with each of the number of days presented on the calendar which overlap with the date range of the event.

10. The method of claim 1, further comprising:
causing, by the at least one processor, a plurality of selectable event indicators each associated with respective ones of a plurality of events to be graphically presented on the calendar.

11. The method of claim 10 wherein each of the plurality of events is associated with at least one category, and causing a plurality of selectable event indicators to be graphically presented on the calendar comprises causing a plurality of selectable event indicators to be graphically presented on the calendar in an order determined at least in part on the respective categories of each of the plurality of events.

12. The method of claim 1, further comprising:
causing, by the at least one processor, a graphical representation of at least one media object associated with the event to be displayed on the calendar, the graphical representation of the at least one media object located on a particular day, month, year or decade displayed on the calendar which overlaps with the date range of the event.

13. The method of claim 12, further comprising:
determining, by the at least one processor, which of the at least one media object associated with the event to display on the calendar based at least in part on one or more criteria.

14. The method of claim 13 wherein determining which of the at least one media object to display on the calendar comprises determining which of the at least one media object to display on the calendar based at least in part on user ratings of the media objects associated with the event.

15. The method of claim 13 wherein determining which of the at least one media object to display on the calendar comprises determining which of the at least one media object to display on the calendar based at least in part on at least one of: a user rating, a tag, text associated with the media object, viewing information for the media object, editing information for the media object, sharing information the media object, or a creation date for the media object.

16. The method of claim 1, further comprising:
generating, by the at least one processor, an event smart album associated with the event, the event smart album comprising each of the media objects associated with the generated event.

17. The method of claim 16, further comprising:
causing, by the at least one processor, the generated event smart album to be graphically presented by the user interface of the at least one of the plurality of processor-based devices in a timeline comprising a plurality of event smart albums sorted based at least in part on the respective date ranges of the plurality of event smart albums.

18. The method of claim 17 wherein causing the generated event smart album to be graphically presented comprises causing at least one media object associated with the event smart album to be graphically presented by the user interface of the at least one of the plurality of processor-based devices.

19. The method of claim 18, further comprising:
determining, by the at least one processor, which of the at least one media object associated with the event smart album to display based at least in part on one or more criteria.

20. The method of claim 19 wherein determining which of the at least one media object to display comprises determining which of the at least one media object to display based at least in part on user ratings of the media objects associated with the event smart album.

21. The method of claim 18 wherein determining which of the at least one media object to display comprises determining which of the at least one media object to display based at least in part on at least one of: a user rating, a tag, text associated with the media object, viewing information for the media object, editing information for the media object, sharing information the media object, or a creation date for the media object.

22. The method of claim 1 wherein storing wherein storing a media library which comprises a plurality of media objects comprises storing a media library which comprises a plurality of media objects on at least two nontransitory processor-readable storage media associated with a respective at least two computing devices.

23. The method of claim 1 wherein storing a media library which comprises a plurality of media objects comprises storing a media library which comprises a plurality of media objects comprising at least two or more media object types selected from the group of media object types consisting of: image media objects, video media objects, and document media objects.

24. The method of claim 1, further comprising:
receiving, by the at least one processor, an indication of a category for the event; and
logically associating, by the at least one processor, the indicated category with the event in the at least one nontransitory processor-readable storage medium.

25. The method of claim 24, further comprising:
determining, by the at least one processor, whether the indicated event has a sub-event associated with the event; and
responsive to determining the indicated event has a sub-event associated with the event, restricting, by the at least one processor, a permitted date range for the event to be not less than a specified date range of the sub-event.

26. The method of claim 1, further comprising:
causing, by the at least one processor, a plurality of selectable event indicators associated with a respective plurality of events to be dynamically graphically presented on the calendar, the number and order of the plurality of selectable event indicators graphically presented on the calendar based at least in part on a priority of the event, a date range of the event, a duration of the event, or an amount of space available on the user interface of the at least one of the plurality of processor-based devices.

27. The method of claim 1, further comprising:
receiving, by the at least one processor via the user interface of at least one of the plurality of processor-based devices, one or more filtering criteria; and
modifying which of the plurality of media objects are associated with the generated event based at least in part on the received one or more filtering criteria.

28. The method of claim 27 wherein receiving one or more filtering criteria comprises receiving at least one of: textual filtering criteria, media type filtering criteria, media content filtering criteria, or user rating filtering criteria.

29. A data storage system to present a plurality of objects stored across a plurality of processor-based devices, the data storage system comprising:
at least one nontransitory processor-readable medium that stores processor-executable instructions; and
at least one processor communicably coupled to the at least one nontransitory processor-readable medium, the at least one processor:
stores a media library which comprises a plurality of media objects in the at least one nontransitory processor-readable storage medium;
extracts respective creation date data from each of the plurality of objects in the media library;
receives a request to generate an event associated with the media library via a user interface of at least one of the plurality of processor-based devices;
responsive to receipt of the request to generate an event, causes an event generation interface to be presented to a user via the user interface of the at least one of the plurality of processor-based devices, the event generation interface provides a request for a date range of the event;
receives, via the user interface of the at least one of the plurality of processor-based devices, an indication of the date range for the event, wherein the date range for the event overlaps with a date range for a previously generated event;
for each of the plurality of media objects in the media library, evaluates the extracted creation date data to determine whether the media object was created within the specified date range of the event;
logically associates media objects determined to have been created within the specified date range of the event with the event in the at least one nontransitory processor-readable storage medium;
dynamically adjusts the specified date range of the event responsive to the event being logically associated with an additional media object or logically disassociated from a media object;
causes a calendar to be graphically presented via the user interface of the at least one of the plurality of processor-based devices; and
causes a selectable event indicator associated with the generated event to be graphically presented on the calendar, the selectable event indicator sized and positioned on the calendar to be associated with at least one of a date or a date range displayed by the calendar.

30. The data storage system of claim 29 wherein the at least one processor:
receives, via the user interface of the at least one of the plurality of processor-based devices, a start day and an end day for the event.

31. The data storage system of claim 29 wherein the at least one processor:
receives, via the user interface of the at least one of the plurality of processor-based devices, an imprecise date range.

32. The data storage system of claim 29 wherein the at least one processor:
receives, via the user interface of the at least one of the plurality of processor-based devices, a start day and an end day for the event, at least one of the start day and the end day specified by the user by decade, year or month.

33. The data storage system of claim 29 wherein the at least one processor:
causes the selectable event indicator to be displayed on the calendar associated with at least one of a: day, month, year or decade.

34. The data storage system of claim 29 wherein the at least one processor:
receives, via the user interface of the at least one of the plurality of processor-based devices, an indication of a selection of the selectable event indicator; and
responsive to receipt of the indication of a selection of the selectable event indicator, causes a presentation of the media objects associated with the generated event on the user interface of the at least one of the plurality of processor-based devices.

35. A method of operation for a data storage system to present a plurality of objects across a plurality of processor-based devices, the method comprising:
storing, in at least one nontransitory processor-readable storage medium of the data storage system, a media library which comprises a plurality of media objects stored in a plurality of containers;
receiving, by at least one processor via a user interface of at least one of the plurality of processor-based devices, a request to generate an event associated with the media library, the request specifying at least an indication of at least one container of the plurality of containers to be associated with the event;
for each of the plurality of media objects in the indicated at least one container, extracting, by at least one processor, respective creation date data from each of the plurality of media;
determining, by the at least one processor, a date range for the event based on the extracted creation date data for the plurality of media objects in the indicated at least one container, wherein the date range for the event overlaps with a date range for a previously generated event;
generating, by the at least one processor, an event having the determined date range which contains the media objects in the indicated at least one container;
dynamically adjusting the specified date range of the event responsive to an additional media object being added to the indicated at least one container or a media object being removed from the indicated at least one container;
causing, by the at least one processor, a calendar to be graphically presented via the user interface of the at least one of the plurality of processor-based devices; and
causing, by the at least one processor, a selectable event indicator associated with the generated event to be graphically presented on the calendar, the selectable event indicator sized and positioned on the calendar to be associated with at least one of a date or a date range displayed by the calendar.

\* \* \* \* \*